(12) United States Patent
Sarwer et al.

(10) Patent No.: US 12,335,527 B2
(45) Date of Patent: *Jun. 17, 2025

(54) TRANSFORM-SKIP RESIDUAL CODING OF VIDEO DATA

(71) Applicant: ALIBABA GROUP HOLDING LIMITED, Grand Cayman (KY)

(72) Inventors: Mohammed Golam Sarwer, San Mateo, CA (US); Yan Ye, San Mateo, CA (US); Jiancong Luo, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,306

(22) Filed: May 30, 2024

(65) Prior Publication Data

US 2024/0323443 A1  Sep. 26, 2024

Related U.S. Application Data

(63) Continuation of application No. 16/872,643, filed on May 12, 2020, now Pat. No. 12,041,270.

(60) Provisional application No. 62/953,460, filed on Dec. 24, 2019, provisional application No. 62/902,115, filed on Sep. 18, 2019, provisional application No. 62/865,916, filed on Jun. 24, 2019.

(51) Int. Cl.
*H04N 19/645* (2014.01)
*H04N 19/176* (2014.01)
*H04N 19/18* (2014.01)

(52) U.S. Cl.
CPC ......... *H04N 19/645* (2014.11); *H04N 19/176* (2014.11); *H04N 19/18* (2014.11)

(58) Field of Classification Search
CPC ..... H04N 19/176; H04N 19/18; H04N 19/645
See application file for complete search history.

(56) References Cited

U.S. PATENT DOCUMENTS

| | | | |
|---|---|---|---|
| 10,904,548 B2 | 1/2021 | Karczewicz et al. | |
| 2013/0003834 A1 | 1/2013 | Sole Rojals et al. | |

(Continued)

FOREIGN PATENT DOCUMENTS

| | | |
|---|---|---|
| CN | 1391383 A | 1/2003 |
| CN | 102255858 A | 11/2011 |

(Continued)

OTHER PUBLICATIONS

The first Office Action issued by Chinese Patent Office in corresponding with a Chinese Application No. 202080046743.6, mailed Jan. 11, 2024. (58 pages).

(Continued)

*Primary Examiner* — Zhubing Ren
(74) *Attorney, Agent, or Firm* — Finnegan, Henderson, Farabow, Garrett & Dunner, LLP

(57) ABSTRACT

The present disclosure provides systems and methods for transform-skip residual video data coding and decoding. One exemplary method comprises: performing a first pass of scanning a transform coefficient of a sub-block of a video frame, wherein the first pass of scanning comprises: bypass coding a parity level flag for the transform coefficient, the parity level flag indicating a parity of an absolute value of a level of the transform coefficient.

20 Claims, 27 Drawing Sheets

(56) References Cited

U.S. PATENT DOCUMENTS

| | | | |
|---|---|---|---|
| 2013/0003835 A1 | 1/2013 | Sole Rojals et al. | |
| 2013/0272389 A1 | 10/2013 | Sze et al. | |
| 2013/0272424 A1 | 10/2013 | Sole Rojals et al. | |
| 2014/0003530 A1 | 1/2014 | Sole Rojals et al. | |
| 2015/0071359 A1 | 3/2015 | Guo et al. | |
| 2015/0264348 A1 | 9/2015 | Zou et al. | |
| 2015/0281706 A1* | 10/2015 | Ström | H04N 19/547 375/240.02 |
| 2017/0142448 A1 | 5/2017 | Karczewicz et al. | |
| 2019/0052909 A1 | 2/2019 | Choi et al. | |
| 2020/0077117 A1 | 3/2020 | Karczewicz et al. | |
| 2020/0244995 A1 | 7/2020 | Hsiang | |
| 2020/0260080 A1 | 8/2020 | Choi et al. | |
| 2020/0288134 A1 | 9/2020 | Lim et al. | |
| 2020/0322607 A1* | 10/2020 | Hsiang | H04N 19/13 |
| 2022/0094939 A1* | 3/2022 | Chuang | H04N 19/18 |

FOREIGN PATENT DOCUMENTS

| | | |
|---|---|---|
| CN | 103262534 A | 8/2013 |
| CN | 103650510 A | 3/2014 |
| CN | 104205832 A | 12/2014 |
| CN | 107925764 A | 4/2018 |
| CN | 108737384 A | 11/2018 |

OTHER PUBLICATIONS

The Search Report issued by Chinese Patent Office in corresponding with a Chinese Application No. 202080046743.6, mailed Jan. 11, 2024. (4 pages).
Gon Wenbin, "Research on Information Hiding Technology Based on HEVC Video," South China University of Technology, Guangzhou, China, Apr. 2018 (70 pages).
Jianle Chen, et al., "H0554 non-CE1: Throughput improvement on CABAC coefficients level coding," JCTVC, Qualcomm, Feb. 3, 2012.
European Patent Office Communication issued for Application No. 20830907.0 which encloses the extended European Search Report which includes pursuant to Rule 62 EPC, the Supplementary European Search Report (Art. 153(7) EPC) and the European search opinion, dated Jan. 20, 2023, 19 pages.
Bross et al., "Non-CE8: Unified Transform Type Signalling and Residual Coding for Transform Skip," JVET-M0464-v4, 13th Meeting: Marrakech, MA, Jan. 9-18, 2019, 13 pages.
Karczewicz, et al., "CE7-related: unified Rice parameter derivation for coefficient coding," JVET-M0469, 13th Meeting: Marrakech, MA Jan. 9-18, 2019, 4 pages.
Kato, et al., "CE7-relatead: Unification of CCB check method and bypass coding between two residual coding modes," JVET-P0298-v1, 16th Meeting: Geneva, CH, Oct. 1-11, 2019, 11 pages.
Sarwer et al., "CE7-1.3: Simplification of transform-skip residual coding," JVET-P0072-v1, 16th Meeting: Geneva, CH, Oct. 1-11, 2019, 13 pages.
Sarwer et al., "Non-CE7: Simplification of transform skip residual coding," JVET-O0619-v3, 15th Meeting: Gothenburg, SE, Jul. 3-12, 2019, 16 pages.
Schwarz et al., "CE7: Transform coefficient coding with reduced number of regular-coded bins (tests 7.1.3a, 7.1.3b)," JVET-L0274-v3, 12th Meeting: Macao, CN, Oct. 3-12, 2018, 19 pages.
Zhao et al., "CE8-related: Modified limitation on context coded bins for CE8-4.4a and CE8-5.1a," JVED-N0366-v3, 14th Meeting: Geneva, CH, Mar. 19-27, 2019, 3 pages.
Jianle Chen et al. "Algorithm description for Versatile Video Coding and test Model 5 (VTM 5)" International organization for standardization Coding of moving pictures and audio, 14th meeting Geneva, CH, JVET-N1002-v2, 77 pages (2019).
Jianle Chen et al. "Algorithm Description of Joint Exploration Test Model 7 (JEM 7)" Joint Video Explorations Teams (JVET), 7th Meeting: Torino, IT, JVET-G1001-v1. 50 pages (2017).
T. Nguyen et al. "Residual Coding for Transform Skip Mode in Versatile Video Coding" 2020 Data Compression Conference (DCC)pp. 1-10 (2020).
Gary J. Sullivan et al. "Overview of the High Efficiency Video Coding (HEVC) Standard" IEE Transactions on Circuits and Systems for Video Technology vol. 22 No. 12, pp. 1649-1668 (2012).
A. Segall et al. "Joint Call for Proposals on Video Compression with Capability beyond HEVC." Joint Video Exploration Team (JVET), 8th Meeting: Macao, CN27 pages (2017).
International Telecommunications Union "Series H: Audiovisual and Multimedia Systems Infrastructure of audiovisual services—Coding of moving video", ITU-T Telecommunication Standardization Sector of ITU, pp. 1-692 (2018).
Benjamin Bross et al. "Versatile Video Coding (Draft 5)" International organization for standardization organization international de normalization ISO/IEC JTC1/SC29/WG11 coding of moving pictures and audio, JVET-N1001-v10, 406 pages (2019).
Benjamin Bross et al. "Versatile Video Coding (Draft 6)" Joint Video Experts Team (JVET) of ITU-T, 15th Meeting: Gothenburg, SE, JVET-O2001-vE 455 pages (2019).
Benjamin Bross et al. "Versatile Video Coding (Draft 7)," Joint Video Experts Team (JVET), 16 Meeting: Geneva, CH, JVET-P2001-v1, 455 pages (2019).
International Search Report and written opinion in related International Application No. PCT/US2020/032460, mailed Jul. 29, 2020 (11 pgs).
First Office Action issued in corresponding Chinese Application No. 202080046743.6 on Aug. 23, 2024, 2024 (40 pages).
Schwarz et al., "Description of Core Experiment 7 (CE 7): Quantization and coefficient coding," JvET-K1027, 11th Meeting: Ljubljana, SI, Jul. 10-18, 2018, 17 pages.
Xu et al., "CE8-related: BDPCM entropy coding with reduced number of context coded bins," JVET-M0449, 13th Meeting: Marrakech, MA, Jan. 9-18, 2019, 2 pages.

* cited by examiner

| | Descriptor |
|---|---|
| residual_coding( x0, y0, log2TbWidth, log2TbHeight, cIdx ) { | |
|   if( tu_mts_idx[ x0 ][ y0 ] > 0 \|\| <br>    ( cu_sbt_flag && log2TbWidth < 6 && log2TbHeight < 6 ) ) <br>    && cIdx = = 0 && log2TbWidth > 4 ) | |
|     log2ZoTbWidth = 4 | |
|   Else | |
|     log2ZoTbWidth = Min( log2TbWidth, 5 ) | |
|   MaxCcbs = 2 * ( 1 << log2TbWidth ) * ( 1 << log2TbHeight ) | |
|   if( tu_mts_idx[ x0 ][ y0 ] > 0 \|\| <br>    ( cu_sbt_flag && log2TbWidth < 6 && log2TbHeight < 6 ) ) <br>    && cIdx = = 0 && log2TbHeight > 4 ) | |
|     log2ZoTbHeight = 4 | |
|   Else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTbWidth | |
|   log2TbHeight = log2ZoTbHeight | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) { | |
|     if( log2TbWidth < 2 ) { | |
|       log2SbW = log2TbWidth | |
|       log2SbH = 4 - log2SbW | |
|     } else if( log2TbHeight < 2 ) { | |
|       log2SbH = log2TbHeight | |
|       log2SbW = 4 - log2SbH | |
|     } | |
|   } | |
|   numSbCoeff = 1 << ( log2SbW + log2SbH ) | |
|   lastScanPos = numSbCoeff | |
|   lastSubBlock = ( 1 << ( log2TbWidth + log2TbHeight - ( log2SbW + log2SbH ) ) ) - 1 | |
|   do { | |

FIG. 3

| | |
|---|---|
| if( lastScanPos == 0 ) { | |
|    lastScanPos = numSbCoeff | |
|    lastSubBlock- - | |
|    } | |
| lastScanPos- - | |
| xS = DiagScanOrder[ log2TbWidth - log2SbW ][ log2TbHeight - log2SbH ]<br>     [ lastSubBlock ][ 0 ] | |
| yS = DiagScanOrder[ log2TbWidth - log2SbW ][ log2TbHeight - log2SbH ]<br>     [ lastSubBlock ][ 1 ] | |
| xC = ( xS << log2SbW ) + DiagScanOrder[ log2SbW ][ log2SbH ][ lastScanPos ][ 0 ] | |
| yC = ( yS << log2SbH ) + DiagScanOrder[ log2SbW ][ log2SbH ][ lastScanPos ][ 1 ] | |
| } while( ( xC != LastSignificantCoeffX ) || ( yC != LastSignificantCoeffY ) ) | |
| QState = 0 | |
| for( i = lastSubBlock; i >= 0; i- - ) { | |
|   startQStateSb = QState | |
|   xS = DiagScanOrder[ log2TbWidth - log2SbW ][ log2TbHeight - log2SbH ]<br>     [ i ][ 0 ] | |
|   yS = DiagScanOrder[ log2TbWidth - log2SbW ][ log2TbHeight - log2SbH ]<br>     [ i ][ 1 ] | |
|   inferSbDcSigCoeffFlag = 0 | |
|   if( ( i < lastSubBlock ) && ( i > 0 ) ) { | |
|     coded_sub_block_flag[ xS ][ yS ] | ae(v) |
|     inferSbDcSigCoeffFlag = 1 | |
|   } | |
|   firstSigScanPosSb = numSbCoeff | |
|   lastSigScanPosSb = -1 | |
|   remBinsPass1 = ( ( log2SbW + log2SbH ) < 4 ? 8 : 32 ) | |
|   firstPosMode0 = ( i == lastSubBlock ? lastScanPos : numSbCoeff - 1 ) | |
|   firstPosMode1 = -1 | |
|   for( n = firstPosMode0; n >= 0 && remBinsPass1 >= 4; n- - ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( coded_sub_block_flag[ xS ][ yS ] && ( n > 0 || !inferSbDcSigCoeffFlag ) &&<br>      ( xC != LastSignificantCoeffX || yC != LastSignificantCoeffY ) ) { | |
|       sig_coeff_flag[ xC ][ yC ] | ae(v) |
|       remBinsPass1- - | |
|       if( sig_coeff_flag[ xC ][ yC ] ) | |
|         inferSbDcSigCoeffFlag = 0 | |
|     } | |
|     if( sig_coeff_flag[ xC ][ yC ] ) { | |
|       if( !transform_skip_flag[ x0 ][ y0 ] ) { | |
|         numSigCoeff++ | |

FIG. 3 (continued)

| | |
|---|---|
| if( ( n >= 8 && i == 0 && ( log2TbWidth == 2 \|\| log2TbWidth == 3 ) && ( log2TbWidth == log2TbHeight ) ) \|\| ( ( i == 1 \|\| i == 2 ) && log2TbWidth >= 3 && log2TbHeight >= 3 ) ) | |
| numZeroOutSigCoeff++ | |
| } | |
| abs_level_gtx_flag[ n ][ 0 ] | ae(v) |
| remBinsPass1 - - | |
| if( abs_level_gtx_flag[ n ][ 0 ] ) { | |
| par_level_flag[ n ] | ae(v) |
| remBinsPass1 - - | |
| abs_level_gtx_flag[ n ][ 1 ] | ae(v) |
| remBinsPass1 - - | |
| } | |
| if( lastSigScanPosSb == -1 ) | |
| lastSigScanPosSb = n | |
| firstSigScanPosSb = n | |
| } | |
| AbsLevelPass1[ xC ][ yC ] = sig_coeff_flag[ xC ][ yC ] + par_level_flag[ n ] + abs_level_gtx_flag[ n ][ 0 ] + 2 * abs_level_gtx_flag[ n ][ 1 ] | |
| if( dep_quant_enabled_flag ) | |
| QState = QStateTransTable[ QState ][ AbsLevelPass1[ xC ][ yC ] & 1 ] | |
| if( remBinsPass1 < 4 ) | |
| firstPosMode1 = n - 1 | |
| } | |
| for( n = numSbCoeff - 1; n >= firstPosMode1; n- - ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( abs_level_gtx_flag[ n ][ 1 ] ) | |
| abs_remainder[ n ] | ae(v) |
| AbsLevel[ xC ][ yC ] = AbsLevelPass1[ xC ][ yC ] + 2 * abs_remainder[ n ] | |
| } | |
| for( n = firstPosMode1; n >= 0; n- - ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| dec_abs_level[ n ] | ae(v) |
| if(AbsLevel[ xC ][ yC ] > 0 ) | |
| firstSigScanPosSb = n | |
| if( dep_quant_enabled_flag ) | |
| QState = QStateTransTable[ QState ][ AbsLevel[ xC ][ yC ] & 1 ] | |
| } | |
| if( dep_quant_enabled_flag \|\| !sign_data_hiding_enabled_flag ) | |
| signHidden = 0 | |
| Else | |

FIG. 3 (continued)

| | |
|---|---|
| signHidden = ( lastSigScanPosSb − firstSigScanPosSb > 3 ? 1 : 0 ) | |
| for( n = numSbCoeff − 1; n >= 0; n−− ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( ( AbsLevel[ xC ][ yC ] > 0 ) && <br>     ( !signHidden \|\| ( n != firstSigScanPosSb ) ) ) | |
|     coeff_sign_flag[ n ] | ae(v) |
| } | |
| if( dep_quant_enabled_flag ) { | |
|   QState = startQStateSb | |
|   for( n = numSbCoeff − 1; n >= 0; n−− ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( AbsLevel[ xC ][ yC ] > 0 ) | |
|       TransCoeffLevel[ x0 ][ y0 ][ cIdx ][ xC ][ yC ] = <br>         ( 2 * AbsLevel[ xC ][ yC ] − ( QState > 1 ? 1 : 0 ) ) * <br>         ( 1 − 2 * coeff_sign_flag[ n ] ) | |
|     QState = QStateTransTable[ QState ][ par_level_flag[ n ] ] | |
| } else { | |
|   sumAbsLevel = 0 | |
|   for( n = numSbCoeff − 1; n >= 0; n−− ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( AbsLevel[ xC ][ yC ] > 0 ) { | |
|       TransCoeffLevel[ x0 ][ y0 ][ cIdx ][ xC ][ yC ] = <br>         AbsLevel[ xC ][ yC ] * ( 1 − 2 * coeff_sign_flag[ n ] ) | |
|       if( signHidden ) { | |
|         sumAbsLevel += AbsLevel[ xC ][ yC ] | |
|         if( ( n == firstSigScanPosSb ) && ( sumAbsLevel % 2 ) == 1 ) ) | |
|           TransCoeffLevel[ x0 ][ y0 ][ cIdx ][ xC ][ yC ] = <br>             −TransCoeffLevel[ x0 ][ y0 ][ cIdx ][ xC ][ yC ] | |
|       } | |
|     } | |
|   } | |
| } | |
| } | |
| } | |

FIG. 3 (continued)

| | Descriptor |
|---|---|
| residual_ts_coding( x0, y0, log2TbWidth, log2TbHeight, cIdx ) { | |
|   log2SbSize = ( Min( log2TbWidth, log2TbHeight ) < 2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   inferSbCbf = 1 | |
|   MaxCcbs = 2 * ( 1 << log2TbWidth ) * ( 1 << log2TbHeight ) | |
|   for( i =0; i <= lastSubBlock; i++ ) { | |
|     xS = DiagScanOrder[ log2TbWidth − log2SbSize ][ log2TbHeight − log2SbSize ][ i ][ 0 ] | |
|     yS = DiagScanOrder[ log2TbWidth − log2SbSize ][ log2TbHeight − log2SbSize ][ i ][ 1 ] | |
|     if( ( i != lastSubBlock \|\| !inferSbCbf ) { | |
|       coded_sub_block_flag[ xS ][ yS ] | ae(v) |
|       MaxCcbs− − | |
|     } | |
|     if( coded_sub_block_flag[ xS ][ yS ] && i < lastSubBlock ) | |
|       inferSbCbf = 0 | |
|   /* First scan pass */ | |
|     inferSbSigCoeffFlag = 1 | |
|     for( n = 0; n <= numSbCoeff − 1; n++ ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && <br>         ( n != numSbCoeff − 1 \|\| !inferSbSigCoeffFlag ) ) { | |
|         sig_coeff_flag[ xC ][ yC ] | ae(v) |
|         MaxCcbs− − | |
|         if( sig_coeff_flag[ xC ][ yC ] ) | |
|           inferSbSigCoeffFlag = 0 | |
|       } | |
|       if( sig_coeff_flag[ xC ][ yC ] { | |
|         coeff_sign_flag[ n ] | ae(v) |
|         MaxCcbs− − | |
|         abs_level_gtx_flag[ n ][ 0 ] | ae(v) |
|         MaxCcbs− − | |
|         if( abs_level_gtx_flag[ n ][ 0 ] ) { | |
|           par_level_flag[ n ] | ae(v) |
|           MaxCcbs− − | |
|         } | |
|       } | |
|       AbsLevelPassX[ xC ][ yC ] = <br>         sig_coeff_flag[ xC ][ yC ] + par_level_flag[ n ] + abs_level_gtx_flag[ n ][ 0 ] | |

FIG. 4

| | |
|---|---|
|     } | |
| /* Greater than X scan passes (numGtXFlags=5) */ | |
|   for( j = 1; j < 5; j++ ) { | |
|     for( n = 0; n <= numSbCoeff − 1; n++ ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( abs_level_gtx_flag[ n ][ j − 1 ] ) | |
|         abs_level_gtx_flag[ n ][ j ] | ae(v) |
|       MaxCcbs− − | |
|       AbsLevelPassX[ xC ][ yC ] += 2 * abs_level_gtx_flag[ n ][ j ] | |
|     } | |
|   } | |
| /* remainder scan pass */ | |
|   for( n = 0; n <= numSbCoeff − 1; n++ ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( abs_level_gtx_flag[ n ][ 4 ] ) | |
|       abs_remainder[ n ] | ae(v) |
|     TransCoeffLevel[ x0 ][ y0 ][ cIdx ][ xC ][ yC ] = ( 1 − 2 * coeff_sign_flag[ n ] ) *<br>        ( AbsLevelPassX[ xC ][ yC ] + abs_remainder[ n ] ) | |
|   } | |
|  } | |
| } | |

FIG. 4 (continued)

Pass 1: scanning coefficients of a sub-block, and coding a signal coefficient sign flag and a greater-than-1 flag for each coefficient according to a significance flag of the coefficient — 502

Pass 2: scanning coefficients of the sub-block, and coding a greater-than-3 flag according to the greater-than-1 flag, a greater-than-5 flag according to the greater-than-3 flag, a greater-than-7 flag according to the greater-than-5 flag, and a greater-than-9 flag according to the greater-than-7 flag — 504

Pass 3: scanning coefficients of the sub-block, by-pass coding a parity level flag according to the greater-than-1 flag, processing a remaining absolute level according to the greater-than-0 flag, and by-pass coding the resulting bins — 506

FIG. 5

| residual_ts_coding( x0, y0, log2TbWidth, log2TbHeight, cIdx ) { | Descriptor |
|---|---|
|   log2SbSize = ( Min( log2TbWidth, log2TbHeight ) < 2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   inferSbCbf = 1 | |
|   MaxCcbs = 2 * ( 1 << log2TbWidth ) * ( 1<< log2TbHeight ) | |
|   for( i =0; i <= lastSubBlock; i++ ) { | |
|     xS = DiagScanOrder[ log2TbWidth − log2SbSize ][ log2TbHeight − log2SbSize ][ i ][ 0 ] | |
|     yS = DiagScanOrder[ log2TbWidth − log2SbSize ][ log2TbHeight − log2SbSize ][ i ][ 1 ] | |
|     if( ( i != lastSubBlock || !inferSbCbf ) { | |
|       coded_sub_block_flag[ xS ][ yS ] | ae(v) |
|       MaxCcbs− − | |
|     } | |
|     if( coded_sub_block_flag[ xS ][ yS ] && i < lastSubBlock ) | |
|       inferSbCbf = 0 | |
|     /* First scan pass */ | |
|     inferSbSigCoeffFlag = 1 | |
|     for( n = 0; n <= numSbCoeff − 1; n++ ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && <br>         ( n != numSbCoeff − 1 || !inferSbSigCoeffFlag ) ) { | |
|         sig_coeff_flag[ xC ][ yC ] | ae(v) |
|         MaxCcbs− − | |
|         if( sig_coeff_flag[ xC ][ yC ] ) | |
|           inferSbSigCoeffFlag = 0 | |
|       } | |
|       if( sig_coeff_flag[ xC ][ yC ] { | |
|         coeff_sign_flag[ n ] | ae(v) |
|         MaxCcbs− − | |
|         abs_level_gtx_flag[ n ][ 0 ] | ae(v) |
|         MaxCcbs− − | |
|       } | |
|       AbsLevelPassX[ xC ][ yC ] = <br>         sig_coeff_flag[ xC ][ yC ] + abs_level_gtx_flag[ n ][ 0 ] | |
|     } | |
|     /* Greater than X scan passes (numGtXFlags=5) */ | |
|     for( n = 0; n <= numSbCoeff − 1; n++ ) { | |

FIG. 6

| | |
|---|---|
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| for( j = 1; j < 5; j++ ) { | |
| if( abs_level_gtx_flag[ n ][ j − 1 ] ) | |
|     abs_level_gtx_flag[ n ][ j ] | ae(v) |
| MaxCcbs− − | |
| AbsLevelPassX[ xC ][ yC ] + = 2 * abs_level_gtx_flag[ n ][ j ] | |
|   } | |
| } | |
| /* remainder scan pass */ | |
| for( n = 0; n <= numSbCoeff − 1; n++ ) { | |
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| if( abs_level_gtx_flag[ n ][ 0 ] ) | |
|   par_level_flag[ n ] | ae(v) |
| if( abs_level_gtx_flag[ n ][ 4 ] ) | |
|   abs_remainder[ n ] | ae(v) |
| TransCoeffLevel[ x0 ][ y0 ][ cIdx ][ xC ][ yC ] = ( 1 − 2 * coeff_sign_flag[ n ] ) *<br>    ( AbsLevelPassX[ xC ][ yC ] + par_level_flag[ n ] + abs_remainder[ n ] ) | |
|   } | |
|  } | |
| } | |

FIG. 6 (continued)

Pass 1: scanning coefficients of a sub-block; coding a signal coefficient sign flag and a greater-than-1 flag for each coefficient according to a significance flag of the coefficient, and coding a greater-than-3 flag according to the greater-than-1 flag — 702

Pass 2: scanning coefficients of the sub-block, and coding a greater-than-5 flag according to the greater-than-3 flag, a greater-than-7 flag according to the greater-than-5 flag, and a greater-than-9 flag according to the greater-than-7 flag — 704

Pass 3: scanning coefficients of the sub-block, by-pass coding a parity level flag according to the greater-than-1 flag, processing a remaining absolute level according to the greater-than-0 flag, and by-pass code the resulting bins — 706

FIG. 7

| residual_ts_coding( x0, y0, log2TbWidth, log2TbHeight, cIdx ) { | Descriptor |
|---|---|
|   log2SbSize = ( Min( log2TbWidth, log2TbHeight ) < 2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   inferSbCbf = 1 | |
|   MaxCcbs = 2 * ( 1 << log2TbWidth ) * ( 1<< log2TbHeight ) | |
|   for( i =0; i <= lastSubBlock; i++ ) { | |
|     xS = DiagScanOrder[ log2TbWidth − log2SbSize ][ log2TbHeight − log2SbSize ][ i ][ 0 ] | |
|     yS = DiagScanOrder[ log2TbWidth − log2SbSize ][ log2TbHeight − log2SbSize ][ i ][ 1 ] | |
|     if( ( i != lastSubBlock \|\| !inferSbCbf ) { | |
|       coded_sub_block_flag[ xS ][ yS ] | ae(v) |
|       MaxCcbs−− | |
|     } | |
|     if( coded_sub_block_flag[ xS ][ yS ] && i < lastSubBlock ) | |
|       inferSbCbf = 0 | |
|     /* First scan pass */ | |
|     inferSbSigCoeffFlag = 1 | |
|     for( n = 0; n <= numSbCoeff − 1; n++ ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && <br>         ( n != numSbCoeff − 1 \|\| !inferSbSigCoeffFlag ) ) { | |
|         sig_coeff_flag[ xC ][ yC ] | ae(v) |
|         MaxCcbs−− | |
|         if( sig_coeff_flag[ xC ][ yC ] ) | |
|           inferSbSigCoeffFlag = 0 | |
|       } | |
|       if( sig_coeff_flag[ xC ][ yC ] { | |
|         coeff_sign_flag[ n ] | ae(v) |
|         MaxCcbs−− | |
|         abs_level_gtx_flag[ n ][ 0 ] | ae(v) |
|         MaxCcbs−− | |
|         *if( abs_level_gtx_flag[ n ][ 0 ] );* | |
|           *abs_level_gtx_flag[ n ][ 1 ]* | *ae(v)* |
|           *MaxCcbs−−* | |
|         } | |
|       } | |

FIG. 8

| | |
|---|---|
| AbsLevelPassX[ xC ][ yC ] = sig_coeff_flag[ xC ][ yC ] + abs_level_gtx_flag[ n ][ 0 ] + 2 * abs_level_gtx_flag[ n ][ 1 ] | |
| } | |
| /* Greater than X scan passes (numGtXFlags=5) */ | |
| for( n = 0; n <= numSbCoeff − 1; n++ ) { | |
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| for( j = 2; j < 5; j++ ) { | |
| if( abs_level_gtx_flag[ n ][ j − 1 ] ) | |
| abs_level_gtx_flag[ n ][ j ] | *ae(v)* |
| MaxCcbs− − | |
| AbsLevelPassX[ xC ][ yC ] += 2 * abs_level_gtx_flag[ n ][ j ] | |
| } | |
| } | |
| /* remainder scan pass */ | |
| for( n = 0; n <= numSbCoeff − 1; n++ ) { | |
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| if( abs_level_gtx_flag[ n ][ 0 ] ) | |
| par_level_flag[ n ] | *ae(v)* |
| if( abs_level_gtx_flag[ n ][ 4 ] ) | |
| abs_remainder[ n ] | *ae(v)* |
| TransCoeffLevel[ x0 ][ y0 ][ cIdx ][ xC ][ yC ] = ( 1 − 2 * coeff_sign_flag[ n ] ) * ( AbsLevelPassX[ xC ][ yC ] + par_level_flag[ n ] + abs_remainder[ n ] ) | |
| } | |
| } | |
| } | |

FIG. 8 (continued)

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 10A

| 63 | 62 | 61 | 60 | 59 | 58 | 57 | 56 |
|---|---|---|---|---|---|---|---|
| 55 | 54 | 53 | 52 | 51 | 50 | 49 | 48 |
| 47 | 46 | 45 | 44 | 43 | 42 | 41 | 40 |
| 39 | 38 | 37 | 36 | 35 | 34 | 33 | 32 |
| 31 | 30 | 29 | 28 | 27 | 26 | 25 | 24 |
| 23 | 22 | 21 | 20 | 19 | 18 | 17 | 16 |
| 15 | 14 | 13 | 12 | 11 | 10 | 9 | 8 |
| 7 | 6 | 5 | 4 | 3 | 2 | 1 | 0 |

FIG. 10B

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 0 | 0 | 0 | 0 | 0 | 1 | 1 | 1 | 1 |
| locSumAbs | 16 | 17 | 18 | 19 | 20 | 21 | 22 | 23 | 24 | 25 | 26 | 27 | 28 | 29 | 30 | 31 |
| cRiceParam | 1 | 1 | 1 | 1 | 1 | 1 | 1 | 1 | 1 | 2 | 2 | 2 | 2 | 2 | 2 | 2 |

FIG. 13

```
┌─────────────────────────────────────────────┐
│ Pass 1:scanning coefficients of a sub-block; if the remaining │
│ number of context coded bins are larger than or equal to 4:   │──── 1402
│ coding a signal coefficient sign flag and a greater-than-1 flag│
│ for each coefficient according to a significance flag of the  │
│ coefficient, and coding a greater-than-3 flag according to the│
│ greater-than-1 flag                                           │
└─────────────────────────────────────────────┘
                      │
┌─────────────────────────────────────────────┐
│ Setting a first pass bypass position variable │
│ (iFirstPassBypassPos) to the last position of the previous │──── 1404
│ pass plus 1                                   │
└─────────────────────────────────────────────┘
                      │
┌─────────────────────────────────────────────┐
│ Pass 2: scanning each coefficient starting from the first scan │
│ position of the sub-block to iFirstPassBypassPos; if the       │
│ remaining number of context coded bins are larger than or      │──── 1406
│ equal to 3: coding a greater-than-5 flag according to the      │
│ greater-than-3 flag, a greater-than-7 flag according to the    │
│ greater-than-5 flag, and a greater-than-9 flag according to the│
│ greater-than-7 flag                                            │
└─────────────────────────────────────────────┘
                      │
┌─────────────────────────────────────────────┐
│ Setting a second pass bypass position variable │
│ (iSecondPassBypassPos) to the last position of the previous │──── 1408
│ pass plus 1                                    │
└─────────────────────────────────────────────┘
                      │
┌─────────────────────────────────────────────┐
│ Pass 3(a): scanning coefficients starting from the first scan │
│ position of the sub-block to the iFIrstPassBypassPos, by-      │
│ pass coding a parity level flag according to the greater-than- │──── 1410
│ 1 flag, coding a remaining absolute level according to the     │
│ greater-than-0 flag, and by-pass code the resulting bins       │
└─────────────────────────────────────────────┘
                      │
┌─────────────────────────────────────────────┐
│ Pass 3(b): scanning coefficients starting from │
│ iFirstPassBypassPos to last scan position, coding absolute │──── 1412
│ level, by-pass coding the resulting bins and coding signal │
│ coefficient sign flag                          │
└─────────────────────────────────────────────┘
```

FIG. 14

| | Descriptor |
|---|---|
| residual_ts_coding( x0, y0, log2TbWidth, log2TbHeight, cIdx ) { | |
|   log2SbSize = ( Min( log2TbWidth, log2TbHeight ) < 2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   inferSbCbf = 1 | |
|   MaxCcbs = 2 * ( 1 << log2TbWidth ) * ( 1<< log2TbHeight ) | |
|   for( i =0; i <= lastSubBlock; i++ ) { | |
|     xS = DiagScanOrder[ log2TbWidth − log2SbSize ][ log2TbHeight − log2SbSize ][ i ][ 0 ] | |
|     yS = DiagScanOrder[ log2TbWidth − log2SbSize ][ log2TbHeight − log2SbSize ][ i ][ 1 ] | |
|     if( ( i != lastSubBlock || !inferSbCbf ) { | |
|       coded_sub_block_flag[ xS ][ yS ] | ae(v) |
|       MaxCcbs− − | |
|     } | |
|     if( coded_sub_block_flag[ xS ][ yS ] && i < lastSubBlock ) | |
|       inferSbCbf = 0 | |
|     /* First scan pass */ | |
|     inferSbSigCoeffFlag = 1 | |
|     for( n = 0; n <= numSbCoeff − 1 && *MaxCcbs >= 4*; n++ ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && <br>        ( n != numSbCoeff − 1 || !inferSbSigCoeffFlag ) ) { | |
|         sig_coeff_flag[ xC ][ yC ] | ae(v) |
|         MaxCcbs− − | |
|         if( sig_coeff_flag[ xC ][ yC ] ) | |
|           inferSbSigCoeffFlag = 0 | |
|       } | |
|       if( sig_coeff_flag[ xC ][ yC ] { | |
|         coeff_sign_flag[ n ] | ae(v) |
|         MaxCcbs− − | |
|         abs_level_gtx_flag[ n ][ 0 ] | ae(v) |
|         MaxCcbs− − | |
|         *if( abs_level_gtx_flag[ n ][ 0 ] ){* | |
|           abs_level_gtx_flag[ n ][ 1 ] | ae(v) |
|           *MaxCcbs− −* | |
|         } | |
|       } | |

FIG. 15

| | |
|---|---|
|       AbsLevelPassX[ xC ][ yC ] =<br>         sig_coeff_flag[ xC ][ yC ] + abs_level_gtx_flag[ n ][ 0 ] + 2 *<br>abs_level_gtx_flag[ n ][ 1 ] | |
|   } | |
| iFirstPassBypassPos = n; | |
|   /* second scan pass*/ | |
|   for( n = 0; n < iFirstPassBypassPos && MaxCcbs >= 3; n++ ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     for( j = 2; j < 5; j++ ) { | |
|       if( abs_level_gtx_flag[ n ][ j − 1 ] ) | |
|         abs_level_gtx_flag[ n ][ j ] | ae(v) |
|       MaxCcbs− − | |
|       AbsLevelPassX[ xC ][ yC ] + = 2 * abs_level_gtx_flag[ n ][ j ] | |
|     } | |
|   } | |
| iSecondPassBypassPos = n; | |
|   /* remainder scan pass */ | |
|   for( n = 0; n < iFirstPassBypassPos ; n++) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     minLevel = (scanPos >= iSecondPassBypassPos ? 4 : 10); | |
|     if( abs_level_gtx_flag[ n ][ 0 ] ) | |
|       par_level_flag[ n ] | ae(v) |
|     if( abs_level_gtx_flag[ n ][ 4 ] ) | |
|       abs_remainder[ n ] | ae(v) |
|     TransCoeffLevel[ x0 ][ y0 ][ cIdx ][ xC ][ yC ] = ( 1 − 2 * coeff_sign_flag[ n ] ) *<br>         ( AbsLevelPassX[ xC ][ yC ] + par_level_flag[ n ] +<br>abs_remainder[ n ] ) | |
|   } | |
|   /* dec_abs_level scan pass */ | |
|   for( n = iFirstPassBypassPos; n <= numSbCoeff − 1; n++) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     dec_abs_level[ n ] | ae(v) |
|     if( sig_coeff_flag[ xC ][ yC ] | |
|       coeff_sign_flag[ n ] | ae(v) |
|     TransCoeffLevel[ x0 ][ y0 ][ cIdx ][ xC ][ yC ] = ( 1 − 2 * coeff_sign_flag[ n ] )*<br>dec_abs_level[n] | |
|   } | |
|  } | |
| } | |

FIG. 15 (continued)

1602 — Pass 1:scanning coefficients of a sub-block; if the remaining number of context coded bins are larger than or equal to 8: context coding a significance coefficient flag, coding a signal coefficient sign flag and a greater-than-1 flag for each coefficient according to the significance coefficient flag; coding a greater-than-3 flag according to the greater-than-1 flag; coding a greater-than-5 flag according to the greater-than-3 flag; coding a greater-than-7 flag according to the greater-than-5 flag; and coding a greater-than-9 flag according to the greater-than-7 flag

1604 — Setting a first pass bypass position variable (iFirstPassBypassPos) according to the last position of the previous pass

1606 — Pass 2(a): scanning coefficients starting from the first scan position of the sub-block to iFirstPassBypassPos; if the greater-than-9 flag is equal to 1, binarizing a remaining absolute level using Golomb-Rice code and coding the resulting bins in a bypass mode of the arithmetic coding engine

1608 — Pass 2(b): scanning coefficients starting from the iFirstPassBypassPos to the last scan position; binarizing an absolute level with Golomb-Rice code and coding the resulting bins in a bypass mode of the arithmetic coding engine; by-pass coding a signal coefficient sign flag if the absolute level is not equal to 0

FIG. 16

| | Descriptor |
|---|---|
| residual_ts_coding( x0, y0, log2TbWidth, log2TbHeight, cIdx ) { | |
|   log2SbSize = ( Min( log2TbWidth, log2TbHeight ) < 2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   inferSbCbf = 1 | |
|   MaxCcbs = 2 * ( 1 << log2TbWidth ) * ( 1 << log2TbHeight ) | |
|   for( i =0; i <= lastSubBlock; i++ ) { | |
|     xS = DiagScanOrder[ log2TbWidth − log2SbSize ][ log2TbHeight − log2SbSize ][ i ][ 0 ] | |
|     yS = DiagScanOrder[ log2TbWidth − log2SbSize ][ log2TbHeight − log2SbSize ][ i ][ 1 ] | |
|     if( ( i != lastSubBlock \|\| !inferSbCbf ) { | |
|       coded_sub_block_flag[ xS ][ yS ] | ae(v) |
|     } | |
|     if( coded_sub_block_flag[ xS ][ yS ] && i < lastSubBlock ) | |
|       inferSbCbf = 0 | |
|   /* First scan pass */ | |
|     inferSbSigCoeffFlag = 1 | |
|     for( n = 0; n <= numSbCoeff − 1 && MaxCcbs >= 8; n++ ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && <br>         ( n != numSbCoeff − 1 \|\| !inferSbSigCoeffFlag ) ) { | |
|         sig_coeff_flag[ xC ][ yC ] | ae(v) |
|         MaxCcbs− − | |
|         if( sig_coeff_flag[ xC ][ yC ] ) | |
|           inferSbSigCoeffFlag = 0 | |
|       } | |
|       CoeffSignLevel[ xC ][ yC ] = 0 | |
|       if( sig_coeff_flag[ xC ][ yC ] { | |
|         coeff_sign_flag[ n ] | ae(v) |
|         MaxCcbs− − | |
|         CoeffSignLevel[ xC ][ yC ] = ( coeff_sign_flag[ n ] > 0 ? −1 : 1 ) | |
|         abs_level_gtx_flag[ n ][ 0 ] | ae(v) |
|         MaxCcbs− − | |
|         if( abs_level_gtx_flag[ n ][ 0 ] ) { | |
|           par_level_flag[ n ] | ae(v) |
|           MaxCcbs− − | |
|         } | |
|       } | |
|       AbsLevelPassX[ xC ][ yC ] = <br>         sig_coeff_flag[ xC ][ yC ] + par_level_flag[ n ] + abs_level_gtx_flag[ n ][ 0 ] | |

FIG. 17

| | |
|---|---|
| ~~}~~ | |
| ~~/* Greater than X scan pass (numGtXFlags=5) */~~ | |
| ~~for( n = 0; n <= numSbCoeff − 1; n++ ) {~~ | |
| ~~xC = ( xS << log2SbSize ) + DiagScanOrder[ log2SbSize ][ log2SbSize ][ n ][ 0 ]~~ | |
| ~~yC = ( yS << log2SbSize ) + DiagScanOrder[ log2SbSize ][ log2SbSize ][ n ][ 1 ]~~ | |
|     for( j = 1; j < 5; j++ ) { | |
|       if( abs_level_gtx_flag[ n ][ j − 1 ] ){ | |
|         abs_level_gtx_flag[ n ][ j ] | ae(v) |
|         MaxCcbs− − | |
|         AbsLevelPassX[ xC ][ yC ] += 2 * abs_level_gtx_flag[ n ][ j ] | |
|       } | |
|     } | |
|   } | |
| *iFirstPassBypassPos = n;* | |
|   /* remainder scan pass */ | |
|   for( n = 0; n <= ~~numSbCoeff − 1~~ *iFirstPassBypassPos*; n++ ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( abs_level_gtx_flag[ n ][ 4 ] ) | |
|       abs_remainder[ n ] | ae(v) |
|     if( intra_bdpcm_flag == 0 ) { | |
|       absRightCoeff = abs( TransCoeffLevel[ x0 ][ y0 ][ cIdx ][ xC − 1 ][ yC ] ) | |
|       absBelowCoeff = abs( TransCoeffLevel[ x0 ][ y0 ][ cIdx ][ xC ][ yC − 1 ] ) | |
|       predCoeff = Max( absRightCoeff, absBelowCoeff ) | |
|       if( AbsLevelPassX[ xC ][ yC ] + abs_remainder[ n ] == 1 && predCoeff > 0 ) | |
|         TransCoeffLevel[ x0 ][ y0 ][ cIdx ][ xC ][ yC ] = <br>          ( 1 − 2 * coeff_sign_flag[ n ] ) * predCoeff | |
|       else if( AbsLevelPassX[ xC ][ yC ] + abs_remainder[ n ] <= predCoeff ) | |
|         TransCoeffLevel[ x0 ][ y0 ][ cIdx ][ xC ][ yC ] = ( 1 − 2 * coeff_sign_flag[ n ] ) *<br>          ( AbsLevelPassX[ xC ][ yC ] + abs_remainder[ n ] − 1) | |
|       Else | |
|         TransCoeffLevel[ x0 ][ y0 ][ cIdx ][ xC ][ yC ] = ( 1 − 2 * coeff_sign_flag[ n ] ) *<br>          ( AbsLevelPassX[ xC ][ yC ] + abs_remainder[ n ] ) | |
|     } else | |
|       TransCoeffLevel[ x0 ][ y0 ][ cIdx ][ xC ][ yC ] = ( 1 − 2 * coeff_sign_flag[ n ] ) *<br>        ( AbsLevelPassX[ xC ][ yC ] + abs_remainder[ n ] ) | |
|   } | |
|   /* dec_abs_level scan pass */ | |
|   for( n = *iFirstPassBypassPos*; n <= numSbCoeff − 1; n++ ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |

FIG. 17 (continued)

| | |
|---|---|
| dec_abs_level[ n ] | ae(v) |
| if(dec_abs_level[ n ] ) | |
|     coeff_sign_flag[ n ] | ae(v) |
| if( intra_bdpcm_flag == 0 ) { | |
|     absRightCoeff = abs( TransCoeffLevel[ x0 ][ y0 ][ cIdx ][ xC − 1 ][ yC ] ) | |
|     absBelowCoeff = abs( TransCoeffLevel[ x0 ][ y0 ][ cIdx ][ xC ][ yC − 1 ] ) | |
|     predCoeff = Max( absRightCoeff, absBelowCoeff ) | |
|     if( AbsLevelPassX[ xC ][ yC ] + abs_remainder[ n ] == 1 && predCoeff > 0 ) | |
|         TransCoeffLevel[ x0 ][ y0 ][ cIdx ][ xC ][ yC ] = <br>                ( 1 − 2 * coeff_sign_flag[ n ] ) * predCoeff | |
|     else if( AbsLevelPassX[ xC ][ yC ] + abs_remainder[ n ] <= predCoeff ) | |
|         TransCoeffLevel[ x0 ][ y0 ][ cIdx ][ xC ][ yC ] = ( 1 − 2 * coeff_sign_flag[ n ] ) * <br>                ( AbsLevelPassX[ xC ][ yC ] + abs_remainder[ n ] − 1 ) | |
|     Else | |
|         TransCoeffLevel[ x0 ][ y0 ][ cIdx ][ xC ][ yC ] = ( 1 − 2 * coeff_sign_flag[ n ] ) * <br>                ( AbsLevelPassX[ xC ][ yC ] + abs_remainder[ n ] ) | |
| } else | |
|     TransCoeffLevel[ x0 ][ y0 ][ cIdx ][ xC ][ yC ] = ( 1 − 2 * coeff_sign_flag[ n ] ) * <br>           ( AbsLevelPassX[ xC ][ yC ] + abs_remainder[ n ] ) | |
|     } | |
|   } | |
| } | |

FIG. 17 (continued)

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

FIG. 18

TRANSFORM-SKIP RESIDUAL CODING OF VIDEO DATA

CROSS-REFERENCE TO RELATED APPLICATIONS

The present disclosure is a continuation of application Ser. No. 16/872,643, filed May 12, 2020, which claims priority to and the benefits of priority to: U.S. Provisional Patent Application No. 62/865,916, filed on Jun. 24, 2019; U.S. Provisional Patent Application No. 62/902,115, filed on Sep. 18, 2019; and U.S. Provisional Patent Application No. 62/953,460, filed on Dec. 24, 2019. All of these applications are incorporated herein by reference in their entireties.

TECHNICAL FIELD

The present disclosure generally relates to video data processing, and more particularly, to transform-skip residual coding of video data.

BACKGROUND

New standards for video coding are being developed in the industry of video compression and decompression. For example, the Joint Video Experts Team ("JVET") of the ITU-T Video Coding Expert Group ("VCEG") and the ISO/IEC Moving Picture Expert Group ("MPEG") is currently developing the Versatile Video Coding ("VVC") standard. The VVC standard is aimed at doubling the compression efficiency of its predecessor, the High Efficiency Video Coding ("HEVC/H.265") standard. In other words, VVC's goal is to achieve the same subjective quality as HEVC/H.265 using half the bandwidth.

SUMMARY OF THE DISCLOSURE

The embodiments of the present disclosure provide methods and systems for transform-skip residual video data coding.

One exemplary method comprises: performing a first pass of scanning a transform coefficient of a sub-block of a video frame, wherein the first pass of scanning comprises: bypass coding a parity level flag for the transform coefficient, the parity level flag indicating a parity of an absolute value of a level of the transform coefficient.

Another exemplary method comprises: performing a first pass of scanning a transform coefficient of a sub-block of a video frame, wherein the first pass of scanning comprises: bypass decoding a parity level flag for the transform coefficient, the parity level flag indicating a parity of an absolute value of a level of the transform coefficient.

One exemplary system comprises: a memory storing a set of instructions; and a processor configured to execute the set of instructions to cause the system to: perform a first pass of scanning a transform coefficient of a sub-block of a video frame, wherein the first pass of scanning comprises: bypass coding a parity level flag for the transform coefficient, the parity level flag indicating a parity of an absolute value of a level of the transform coefficient.

Another exemplary system comprises: a memory storing a set of instructions; and a processor configured to execute the set of instructions to cause the system to: perform a first pass of scanning a transform coefficient of a sub-block of a video frame, wherein the first pass of scanning comprises: bypass decoding a parity level flag for the transform coefficient, the parity level flag indicating a parity of an absolute value of a level of the transform coefficient.

BRIEF DESCRIPTION OF THE DRAWINGS

Embodiments and various aspects of the present disclosure are illustrated in the following detailed description and the accompanying figures. Various features shown in the figures are not drawn to scale.

FIG. 3 illustrates an example pseudocode including syntax of transforming coding.

FIG. 4 illustrates an example pseudocode including syntax of transforming skip residual coding.

FIG. 5 illustrates an example method of transform-skip residual coding with the number of coding passes being reduced to 3, according to some embodiments of the present disclosure.

FIG. 6 illustrates an example pseudocode including syntax of the method shown in FIG. 5, according to some embodiments of the present disclosure.

FIG. 7 illustrates another example method of transform-skip residual coding with the number of coding passes being reduced to 3, according to some embodiments of the present disclosure.

FIG. 8 illustrates an example pseudocode including syntax of the method shown in FIG. 7, according to some embodiments of the present disclosure.

FIG. 10A illustrates an 8×8 block before it is flipped, according to some embodiments of the present disclosure.

FIG. 10B illustrates a resultant block after the 8×8 block in FIG. 10A is flipped, according to some embodiments of the present disclosure

FIG. 13 illustrates an example look-up table for Rice parameters, according to some embodiments of the present disclosure.

FIG. 14 illustrates an example method of transform-skip residual coding with the number of coding passes reduced to 3 combined with a single pass bypass coding, according to some embodiments of the present disclosure.

FIG. 15 illustrates an example pseudocode including syntax of bypass coding combined with the method in FIG. 14, according to some embodiments of the present disclosure.

FIG. 16 illustrates an example method of transform-skip residual coding with a first pass for context coding and a second pass for Golomb-Rice coding, according to some embodiments of the present disclosure.

FIG. 17 illustrates an example pseudocode including syntax of bypass coding of the method in FIG. 16, according to some embodiments of the present disclosure.

FIG. 18 illustrates an example look-up table for Rice parameters when minimum bypass coded value is equal to 0, according to some embodiments of the present disclosure.

DETAILED DESCRIPTION

Figure 1:
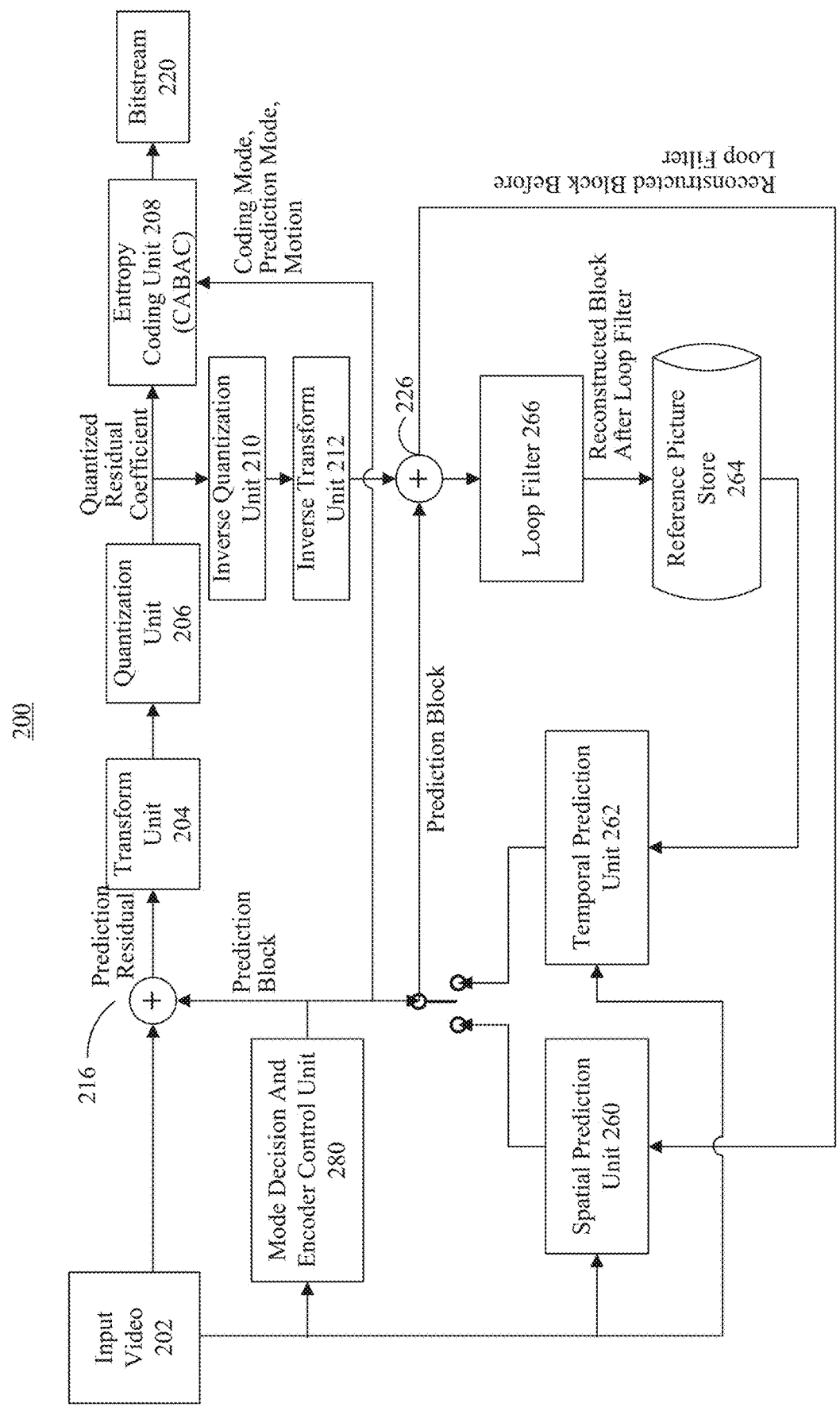
FIG. 1 illustrates an example encoder block diagram of a hybrid video coding system.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

To reduce the storage space and the transmission bandwidth needed by such applications, the video can be compressed. For example, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and the decoder can be collectively referred to as a "codec." The encoder and the decoder can be implemented as any of a variety of suitable hardware, software, or a combination thereof. For example, the hardware implementation of the encoder and the decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and the decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture. If information that was disregarded I the video encoding process cannot be fully reconstructed, the encoding process can be referred to as "lossy." Otherwise, it can be referred to as "lossless." Most encoding processes are lossy, which is a tradeoff to reduce the needed storage space and the transmission bandwidth.

In many cases, the useful information of a picture being encoded (referred to as a "current picture") can include changes with respect to a reference picture (e.g., a picture previously encoded or reconstructed). Such changes can include position changes, luminosity changes, or color changes of the pixels, among which the position changes are mostly concerned. Position changes of a group of pixels that represent an object can reflect the motion of the object between the reference picture and the current picture.

In order to achieve the same subjective quality as HEVC/H.265 using half the bandwidth, the JVET has been developing technologies beyond HEVC using the joint exploration model ("JEM") reference software. As coding technologies were incorporated into the JEM, the JEM achieved substantially higher coding performance than HEVC. The VCEG and MPEG have also formally started the development of a next generation video compression standard beyond HEVC.

The VVC standard continues to include more coding technologies that provide better compression performance. VVC is based on the same hybrid video coding system that has been used in modern video compression standards such as HEVC, H.264/AVC, MPEG2, H.263, etc. FIG. 1 illustrates an example encoder block diagram of a hybrid video coding system. As shown in FIG. 1, video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes. Inter modes (such as uni-prediction or bi-prediction) may refer to a number of temporal-based compression modes.

Referring to FIG. 1, input video signal 202 may be processed block by block. For example, the video block unit may be a 16×16 pixel block (e.g., a macroblock (MB)). The size of the video block units may vary, depending on the coding techniques used, and the required accuracy and efficiency. In HEVC, extended block sizes (e.g., a coding tree unit (CTU)) may be used to compress video signals of resolution, e.g., 1080p and beyond. In HEVC, a CTU may include up to 64×64 luma samples corresponding chroma samples, and associated syntax elements. In VVC, the size of a CTU may be further increased to include 128×128 luma samples, corresponding chroma samples, and associated syntax elements. A CTU can be further divided into coding units (CUs) using, for example, quad-tree, binary tree, or ternary tree. A CU may be further partitioned into prediction units (PUs), for which separate prediction methods may be applied. Each input video block may be processed by using spatial prediction unit 260 or temporal prediction unit 262.

Spatial prediction unit 260 performs spatial prediction (e.g., intra prediction) to the current block/CU using information on the same picture/slice containing the current block. Spatial prediction may use pixels from the already coded neighboring blocks in the same video picture frame/slice to predict the current video block. Spatial prediction may reduce spatial redundancy inherent in the video signal.

Temporal prediction unit 262 performs temporal prediction (e.g., inter prediction) to the current block using information from picture(s)/slice(s) different from the picture/slice containing the current block. Temporal prediction for a video block may be signaled by one or more motion vectors. In unit-directional temporal prediction, only one motion vector indicating one reference picture is used to generate the prediction signal for the current block. On the other hand, in bi-directional temporal prediction, two motion vectors, each indicating a respective reference picture, can be used to generate the prediction signal for the current block. The motion vectors may indicate the amount and the direction of motion between the current block and one or more associated block(s) in the reference frames. If multiple reference pictures are supported, one or more reference picture indices may be sent for a video block. The one or more reference indices may be used to identify from which reference picture(s) in the reference picture store or decoded picture buffer (DPB) 264, the temporal prediction signal may come.

Mode decision and encoder control unit 280 in the encoder may choose the prediction mode, for example, based on rate-distortion optimization. Based on the determined prediction mode, the prediction block can be obtained. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed residual may be added to the prediction block at adder 226 to form the reconstructed video block. The reconstructed video block before loop-filtering may be used to provide reference samples for intra prediction.

The reconstructed video block may go through loop filtering at loop filter 266. For example, loop filtering such as deblocking filter, sample adaptive offset (SAO), and adaptive loop filter (ALF) may be applied. The reconstructed block after loop filtering may be stored in reference picture store 264 and can be used to provide inter prediction reference samples for coding other video blocks. To form the output video bitstream 220, coding mode (e.g., inter or intra), prediction mode information, motion information, and quantized residual coefficients may be sent to the entropy coding unit 208 to further reduce the bit rate, before the data are compressed and packed to form bitstream 220.

Figure 2:
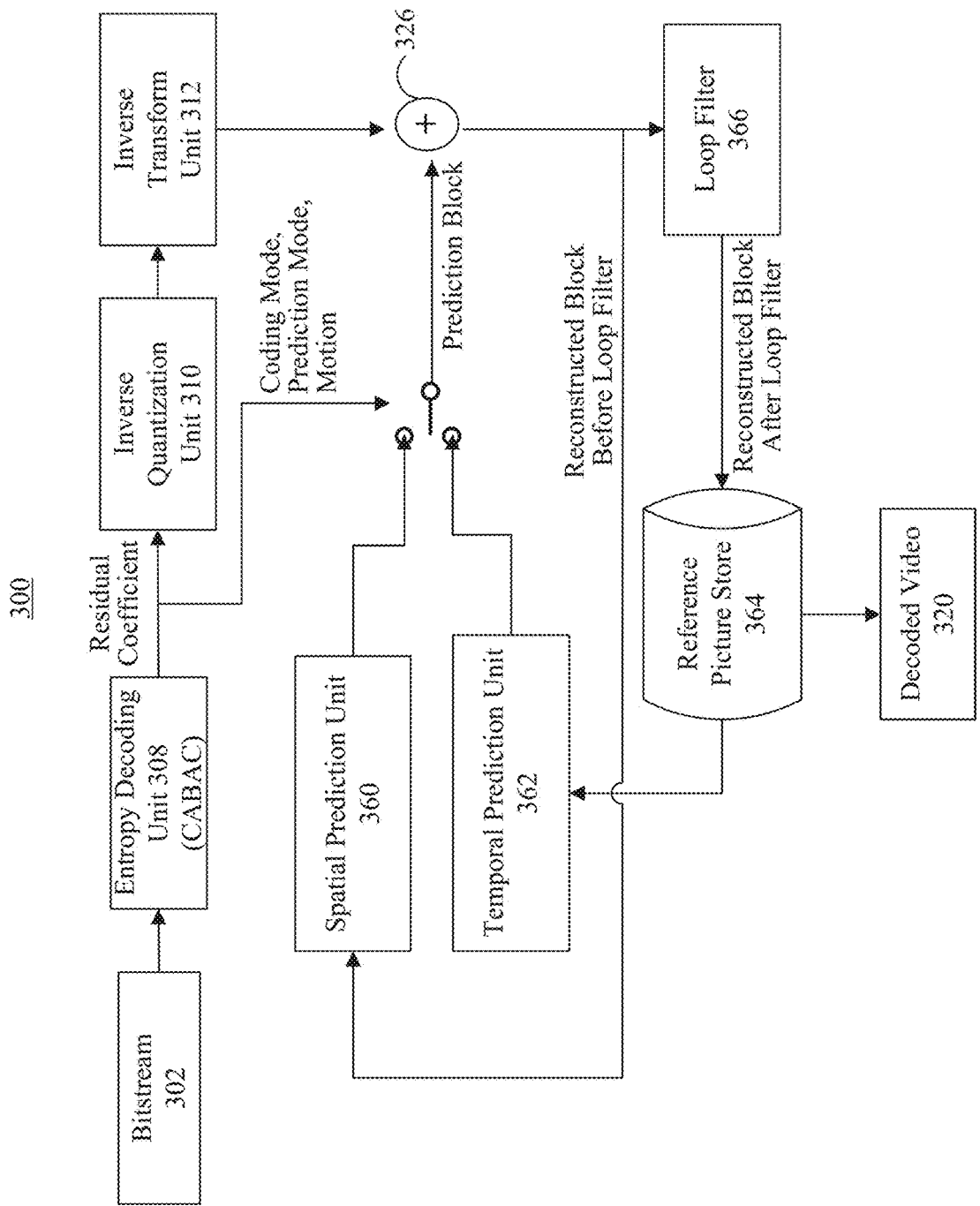
FIG. 2 illustrates an example decoder block diagram of a hybrid video coding system.

FIG. 2 illustrates an example decoder block diagram of a hybrid video coding system. As shown in FIG. 2, a video bitstream 302 may be unpacked or entropy decoded at entropy decoding unit 308. The coding mode information can be used to determine whether the spatial prediction unit 360 or the temporal prediction unit 362 is to be selected. The prediction mode information can be sent to the corresponding prediction unit to generate the prediction block. For example, motion compensated prediction may be applied by the temporal prediction unit 362 to form the temporal prediction block.

The residual coefficients may be sent to inverse quantization unit 310 and inverse transform unit 312 to obtain the reconstructed residual. The prediction block and the reconstructed residual can be added together at 326 to form the reconstructed block before loop filtering. The reconstructed block may then go through loop filtering at loop filer 366. For example, loop filtering such as deblocking filter, SAO, and ALF may be applied. The reconstructed block after loop filtering can then be stored in reference picture store 364. The reconstructed data in the reference picture store 364 may be used to obtain decoded video 320, or used to predict future video blocks. Decoded video 320 may be displayed on a display device, such as the display device 146 as described in system 100 (FIG. 1).

In VVC (e.g., VVC 5), a block can be an M by N array of transform coefficients. A transform coefficient can be a scalar quantity, considered to be in a frequency domain, that is associated with a particular one-dimensional or two-dimensional frequency index in a transform. The transform coefficient levels can be represented by an array TransCoeffLevel[x0][y0][cIdx][xC][yC]. The array indices x0, y0 can specify the location (x0, y0) of the top-left luma sample of the considered transform block relative to the top-left luma sample of the picture. The array index cIdx can specify an indicator for the color component. The array indices xC and yC can specify the transform coefficient location (xC, yC) within the current transform block.

In VVC (e.g., VVC 5), transform coefficients of a coding block are coded using non-overlapped coefficient groups (or sub-blocks). For each sub-block, regular (or context) coded bins and bypass coded bins are separated in coding order. For example, first all regular coded bins for a sub-block are transmitted and, thereafter, the bypass coded bins are transmitted. The transform coefficient levels of a sub-block are coded in three passes over the scan positions. The transform coefficient levels can be values of the transform coefficients. For context coding, each bin can have a probability model that is selected by a context. The context can refer to previously encoded syntax elements. For bypass coding, specific bins can be selected to speed up the coding process with negligible loss of coding efficiency. In bypass coding, bins can be encoded with a set probability (e.g., a probability that is equal to 0.5).

In pass 1, a significance flag (e.g., sig_coeff_flag), a greater-than-1 flag (e.g., gt1_flag), a parity flag (e.g., par_level_flag) and a greater-than-3 flag (e.g., gt3_flag) are coded in order. If the significance flag is equal to 1, first the greater-than-1 flag is coded. The greater-than-1 flag specifies whether the absolute level (e.g., absolute value of the level) is greater than 1. If the greater-than-1 flag is equal to 1, the parity flag and the greater-than-3 flag are coded. The parity flag specifies the parity of the absolute level minus 2. The greater-than-3 flag specifies if the absolute level is greater than 3. A position of a last regular (e.g., context) coded coefficient may be stored in a variable firstPosModel.

In pass 2(a), coding of a remaining absolute level (e.g., abs_remainder) is processed starting from the first scan position of the coefficient group to the firstPosModel position. Only the position with the greater-than-1 flag equal to 1 is coded. A non-binary syntax element is binarized with Golomb-Rice code and the resulting bins are coded in the bypass mode of an arithmetic coding engine. For example, a value of 2 may be represented using a Golomb-Rice code of "001," and each bit of "001" can be referred to as a bin (e.g., bin 0, bin 0, and bin 1).

In pass 2(b), coding of absolute level (dec_abs_level) is processed starting from the first bypass coding position (e.g., firstPosModel-1, from reverse order) to the last scan position of the coefficient group and are completely coded in the bypass mode of the arithmetic coding engine using a Golomb-Rice code.

In pass 3, coding of sign flags (e.g., sign_flag) is processed for all scan positions with sig_coeff_flag equal to 1.

It may be expected that no more than 32 regular-coded bins (e.g., sig_coeff_flag, gt1_flag, par_level_flag, and gt3_flag) are coded or decoded for a 4×4 sub-block. For 2×2 chroma sub-blocks, the number of regular-coded bins may be limited to 8. After the limit is reached, all bins are coded in the bypass mode.

In new residual coding processes adopted by the JVET for the transform-skip residual block, the coefficient scanning order of transform-skip residual coding is forward scanning and starts from top-left position of the transform-skip block. The transform-skip coefficient levels of a sub-block are coded in six passes over the scan positions.

In pass 1, the sig_coeff_flag, the coeff_sign_flag, the greater-than-1 flag (e.g., abs_level_gtx_flag[0]), and the par_level_flag are processed in coding order. If the sig_coeff_flag is equal to 1, the coeff_sign_flag and the abs_level- _gtx_flag[0] are coded in order. The coeff_sign_flag specifies the sign of the transform coefficient level. The abs_level_gtx_flag[0] specifies whether the absolute level is greater than 1. If the abs_level_gtx_flag[0] is equal to 1, the par_level_flag is additionally coded. The par_level_flag specifies the parity of the absolute level minus 2. Before coding any flag, a context-adaptive binary arithmetic coding ("CABAC") engine checks if a context coded bin is available. If the context coded bin is not available, that flag is bypass coded.

In pass 2, if the abs_level_gtx_flag[0] for a given position is equal to 1, a greater-than-3 flag (e.g., abs_level_gtx_flag[1]) is coded. The abs_level_gtx_flag[1] specifies whether the absolute level is greater than 3. Before coding the abs_level_gtx_flag[1] of each coefficient, the CABAC engine checks if a context coded bin is available. If the context coded bin is not available, the abs_level_gtx_flag[1] is bypass coded.

In pass 3, if the abs_level_gtx_flag[1] for a given position is equal to 1, a greater-than-5 flag (e.g., abs_level_gtx_flag[2]) is coded. The abs_level_gtx_flag[2] specifies whether the absolute level is greater than 5. Before coding the abs_level_gtx_flag[2] of each coefficient, the CABAC engine checks if a context coded bin is available. If the context coded bin is not available, the abs_level_gtx_flag[2] is bypass coded.

In pass 4, if the abs_level_gtx_flag[2] for a given position is equal to 1, a greater-than-7 flag (e.g., abs_level_gtx_flag[3]) is coded. The abs_level_gtx_flag[3] specifies whether the absolute level is greater than 7. Before coding the abs_level_gtx_flag[3] of each coefficient, the CABAC engine checks if a context coded bin is available or not. If the context coded bin is not available, the abs_level_gtx_flag[3] is bypass coded.

In pass 5, if the abs_level_gtx_flag[3] for a position is equal to 1, a greater-than-9 flag (e.g., abs_level_gtx_flag[4]) is coded. The abs_level_gtx_flag[4] specifies whether the absolute level is greater than 9. Before coding the abs_level_gtx_flag[4] of each coefficient, the CABAC engine checks if a context coded bin is available. If the context coded bin is not available, the abs_level_gtx_flag[4] is bypass coded.

In pass 6, the abs_remainder is processed for all scan positions with abs_level_gtx_flag[4] equal to 1. The non-binary syntax element is binarized with Golomb-Rice code and the resulting bins are coded in the bypass mode of the arithmetic coding engine.

FIG. 3 illustrates an example pseudocode including syntax of transforming coding. For example, the syntax shown in FIG. 3 can be used for transforming coding in VVC. FIG. 4 illustrates an example pseudocode including syntax of transforming skip residual coding. For example, the syntax shown in FIG. 4 can be used for transforming skip residual coding in VVC.

There are several problems in the current design of transform-skip residual coding. First, the number of coding passes of the transform-skip residual coding is six. That means, in many cases, the CABAC engine needs to scan a coefficient group six times, which significantly affects CABAC's throughput. Second, the number of coding passes of the transform-skip residual coding differs from that of transform residual coding (e.g., six passes vs. three passes). The difference in the number of coding passes can result in hardware implementation complexity. Third, the coefficient scanning of the transform-skip residual coding is forward scan, whereas the scanning of the transformed residual coding is in a reverse order. The difference in scanning order can also result in hardware implementation complexity.

Fourth, in the transformed residual coding, the bypass coding has only two syntax elements (e.g., abs_remainder and dec_abs_level). In the transform-skip residual coding, however, the bypass coding can have many more syntax elements, such as sig_coeff_flag, coeff_sign_flag, par_level_flag, abs_level_gtx_flag[0], abs_level_gtx_flag[1], abs_level_gtx_flag[2], abs_level_gtx_flag[3], abs_level_gtx_flag[4], and abs_remainder. It is desirable to unify the bypass coding method of the transformed residual coding and the transform-skip residual coding.

Embodiments of the present disclosure provide a new bypass coding method of the parity flag. The parity flag specifies the parity of the absolute level minus 2, which indicates whether the absolute value of a non-zero coefficient position is even or odd. The probability distribution of the parity flag in transform-skip block can be uniform. Therefore, the probabilities of even and odd values can be equal. As a result, bypass coding of the parity flag and the signal parity flag can be applied. This bypass coding may take place before or after the abs_remainder is signaled. The parity flag can be signaled if greater-than-1 flag is equal to 1. In some embodiments, since the total number of context coded bins may be limited to 2 bins per sample in the transform block, freeing up the parity flag's context can allow other syntax elements with non-equal probability distribution (e.g., any of the greater-than-x flags that are coded after parity flag) be context coded, which can improve coding efficiency.

In some embodiments, the parity flag is coded as a regular context coded bin and can be signaled in the second pass of the coefficient coding process. The parity flag can be signaled before or after greater-than-3 flag.

In VVC (e.g., VVC 5), a total of four coding passes are used to code the greater-than-3 flag (e.g., abs_level_gtx_flag[1]), the greater-than-5 flag (e.g., abs_level_gtx_flag[2]), the greater-than-7 flag (abs_level_gtx_flag[3]), and the greater-than-9 flag (e.g., abs_level_gtx_flag[4]). In other words, each flag is coded in a separate coding pass. Embodiments of the present disclosure provide a new method to code all the flags in a single pass. As a result, only one coding pass is needed to code all the flags, which can improve CABAC's throughput.

In some embodiments, the position of the greater-than-3 flag (e.g., abs_level_gtx_flag[1]) can be moved to the first coding pass. For example, the greater-than-3 flag can be signaled if the greater-than-1 flag (e.g., abs_level_gtx_flag[1]) is equal to 1. This change can unify the coding of the greater-than-1 flag and the greater-than-3 flag with the transformed residual coding case, which also codes these two flags in the first coding pass.

In some embodiments, the number of coding passes of the transform-skip levels of a sub-block can be reduced to 3. FIG. 5 illustrates an example method of transform-skip residual coding with the number of coding passes reduced to 3, according to some embodiments of the present disclosure. The method in FIG. 5 comprises three passes.

In pass 1 (step 502), coefficients of a sub-block are scanned. In some embodiments, each coefficient starting from a first scan position of a sub-block to a last scan position of that sub-block is scanned. There can be a significance flag (e.g., sig_coeff_flag) for each coefficient. In some embodiments, the significance flag can specify if the level of the coefficient is a non-zero value. If the significance flag for the coefficient indicates that the level is a non-zero value (e.g., the significance flag is equal to 1), a signal coefficient sign flag (e.g., coeff_sign_flag) and a greaterthan-1 flag (e.g., abs_level_gtx_flag[0]) can be coded. The greater-than-1 flag can specify if the absolute value of the level is greater than 1.

In pass 2 (step 504), coefficients of the sub-block are scanned. In some embodiments, each coefficient starting from the first scan position of the sub-block to the last scan position of that sub-block is scanned. If the greater-than-1 flag for a coefficient indicates that the absolute level is greater than 1 (e.g., the greater-than-1 flag is equal to 1), a greater-than-3 flag (e.g., abs_level_gtx_flag[1]) can be coded. The greater-than-3 flag can specify whether the absolute level is greater than 3. If the greater-than-3 flag for the coefficient indicates that the absolute level is greater than 3 (e.g., the greater-than-3 flag is equal to 1), a greater-than-5 flag (e.g., abs_level_gtx_flag[2]) can be coded. The greater-than-5 flag can specify whether the absolute level is greater than 5. If the greater-than-5 flag for the coefficient indicates that the absolute level is greater than 5 (e.g., the greater-than-5 flag is equal to 1), a greater-than-7 flag (e.g., abs_level_gtx_flag[3]) can be coded. The greater-than-7 flag can specify whether the absolute level is greater than 7. If the greater-than-7 flag for the coefficient indicates that the absolute level is greater than 7 (e.g., the greater-than-7 flag is equal to 1), a greater-than-9 flag (e.g., abs_level_gtx_flag[4]) can be coded. The greater-than-9 flag can specify whether the absolute level is greater than 9.

In pass 3 (step 506), coefficients of the sub-block are scanned. In some embodiments, each coefficient starting from the first scan position of the sub-block to the last scan position of that sub-block is scanned. If the greater-than-1 flag for a coefficient indicates that the absolute level is greater than 1 (e.g., the greater-than-1 flag is equal to 1), a parity level flag (e.g., par_level_flag) for the coefficient can be bypass coded. The parity level flag can specify the parity of the absolute level minus 2. If the greater-than-9 flag indicates that the absolute level is greater than 9 (e.g., the greater-than-9 flag is equal to 1), a remaining absolute level (e.g., abs_remainder) for the coefficient can be coded, and the non-binary syntax element can be binarized with Golomb-Rice code. In some embodiments, the resulting bins can be coded in the bypass mode of an arithmetic coding engine.

FIG. 6 illustrates an example pseudocode including syntax of the method shown in FIG. 5, according to some embodiments of the present disclosure. Some portions of the pseudocode in FIG. 6 are italicized, indicating the processing of the greater-than-3 flag, the greater-than-5 flag, the greater-than-7 flag, the greater-than-9 flag, and the parity level flag.

It is appreciated that the method of FIG. 5 can be implemented by an encoder (e.g., encoder of FIG. 1). In some embodiments, the encoder can receive video frames. For a decoder (e.g., decoder of FIG. 2), the method can comprise three passes.

In pass 1, coefficients of a sub-block is scanned. In some embodiments, each coefficient starting from a first scan position of a sub-block to a last scan position of that sub-block is scanned. There can be a significance flag (e.g., sig_coeff_flag) for each coefficient. The significance flag can be decoded. The significance flag can specify if the level is a non-zero value. If the significance flag for the coefficient indicates that the level is a non-zero value (e.g., the significance flag is equal to 1), a signal coefficient sign flag (e.g., coeff_sign_flag) and a greater-than-1 flag (e.g., abs_level_gtx_flag[0]) can be decoded.

In pass 2, coefficients of the sub-block are scanned. In some embodiments, each coefficient starting from the first scan position of the sub-block to the last scan position of that sub-block is scanned. If the greater-than-1 flag for the coefficient indicates that the absolute level is greater than 1 (e.g., the greater-than-1 flag is equal to 1), a parity level flag (e.g., par_level_flag) for each coefficient can be decoded. The parity level flag can specify the parity of the absolute level minus 2. If the greater-than-1 flag for the coefficient indicates that the absolute level is greater than 1 (e.g., the greater-than 1 flag is equal to 1), a greater-than-3 flag (e.g., abs_level_gtx_flag[1]) can be decoded. If the greater-than-3 flag for the coefficient indicates that the absolute levels is greater than 3 (e.g., the greater-than-3 flag is equal to 1), a greater-than-5 flag (e.g., abs_level_gtx_flag[2]) can be decoded. If the greater-than-5 flag for the coefficient indicates that the absolute level is greater than 5 (e.g., the greater-than-4 flag is equal to 1), a greater-than-7 flag (e.g., abs_level_gtx_flag[3]) can be decoded. If the greater-than-7 flag for the coefficient indicates that the absolute level is greater than 7 (e.g., the greater-than-7 flag is equal to 1), a greater-than-9 flag (e.g., abs_level_gtx_flag[4]) can be decoded.

In pass 3, coefficients of the sub-block are scanned. In some embodiments, each coefficient starting from the first scan position of the sub-block to the last scan position of that sub-block is scanned. If the greater-than-9 flag indicates that the absolute level is greater than 9 (e.g., the greater-than-9 flag is equal to 1), a remaining absolute level (e.g., abs_remainder) for the coefficient can be decoded.

In some embodiments, the decoder can receive a video bit-stream.

FIG. 7 illustrates another example method of transform-skip residual coding with the number of coding passes reduced to 3, according to some embodiments of the present disclosure. The method of FIG. 7 can comprise three passes.

In pass 1 (step 702), coefficients of a sub-block are scanned. In some embodiments, each coefficient starting from a first scan position of a sub-block to a last scan position of that sub-block is scanned. There can a significance flag (e.g., sig_coeff_flag) for each coefficient. The significance flag can indicate whether the level is a non-zero value. If the significance flag for the coefficient indicates that the level is a non-zero value (e.g., the significance flag is equal to 1), a signal coefficient sign flag (e.g., coeff_sign_flag) and a greater-than-1 flag (e.g., abs_level_gtx_flag [0]) can be coded. The greater-than-1 flag can specify whether the absolute value of the level is greater than 1. If the greater-than-1 flag for the coefficient indicates that the absolute value of the level is greater than 1 (e.g., the greater-than-1 flag is equal to 1), a greater-than-3 flag (e.g., abs_level_gtx_flag[1]) can be coded. The greater-than-3 flag can specify whether the absolute level is greater than 3.

In pass 2 (step 704), coefficients of the sub-block are scanned. In some embodiments, each coefficient starting from the first scan position of the sub-block to the last scan position of that sub-block is scanned. If the greater-than-3 flag for a coefficient indicates that the absolute level is greater than 3 (e.g., the greater-than-3 flag is equal to 1), a greater-than-5 flag (e.g., abs_level_gtx_flag[2]) can be coded. The greater-than-5 flag can specify whether the absolute level is greater than 5. If the greater-than-5 flag for the coefficient indicates that the absolute level is greater than 5 (e.g., the greater-than-5 flag is equal to 1), a greater-than-7 flag (e.g., abs_level_gtx_flag[3]) can be coded. The greater-than-7 flag can specify whether the absolute level is greater than 7. If the greater-than-7 flag for the coefficient indicates that the absolute level is greater than 7 (e.g., the greater-than-7 flag is equal to 1), a greater-than-9 flag (e.g., abs_level_gtx_flag[4]) can be coded. The greater-than-9 flag can specify whether the absolute level is greater than 9.

In pass 3 (step 706), coefficients of the sub-block are scanned. In some embodiments, each coefficient starting from the first scan position of the sub-block to the last scan position of that sub-block is scanned. If the greater-than-1 flag for a coefficient indicates that the absolute level is greater than 1 (e.g., the greater-than-1 flag is equal to 1), a parity level flag (e.g., par_level_flag) for the coefficient can be bypass coded. The parity level flag can specify the parity of the absolute level minus 2. If the greater-than-9 flag indicates that the absolute level is greater than 9 (e.g., the greater-than-9 flag is equal to 1), a remaining absolute level (e.g., abs_remainder) for the coefficient can be processed, and the non-binary syntax element can be binarized with Golomb-Rice code. The resulting bins can be coded in the bypass mode of an arithmetic coding engine.

Compared with the method in FIG. 5, the method in FIG. 7 processes coding of greater-than-3 flag in pass 1 instead of pass 2. FIG. 8 illustrates an example pseudocode including syntax of the method shown in FIG. 7, according to some embodiments of the present disclosure. Some portions of the pseudocode in FIG. 8 are italicized, indicating the processing of the greater-than-3 flag, the greater-than-5 flag, the greater-than-7 flag, the greater-than-9 flag, and the parity level flag.

It is appreciated that the method in FIG. 7 can be implemented by an encoder (e.g., encoder of FIG. 1). In some embodiments, the encoder can receive video frames. For a decoder (e.g., decoder of FIG. 2), the method can comprise three passes.

In pass 1, coefficients of a sub-block are scanned. In some embodiments, each coefficient starting from a first scan position of a sub-block to a last scan position of that sub-block is scanned. There can be a significance flag (e.g., sig_coeff_flag) for each coefficient. The significance flag is decoded. The significance flag can indicate whether the level is a non-zero value. If the significance flag for the coefficient indicates that the level is a non-zero value (e.g., the significance flag is equal to 1), a signal coefficient sign flag (e.g., coeff_sign_flag) and a greater-than-1 flag (e.g., abs_level_gtx_flag[0]) can be decoded. If the greater-than-1 flag for the coefficient indicates that the absolute level is greater than 1 (e.g., the greater-than-1 flag is equal to 1), a greater-than-3 flag (e.g., abs_level_gtx_flag[1]) can be decoded.

In pass 2, coefficients of the sub-block are scanned. In some embodiments, each coefficient starting from the first scan position of the sub-block to the last scan position of that sub-block is scanned. If the greater-than-1 flag for a coefficient indicates that the absolute level is greater than 1 (e.g., the greater-than-1 flag is equal to 1), a parity level flag (e.g., par_level_flag) for each coefficient can be decoded. If the greater-than-3 flag for the coefficient indicates that the absolute level is greater than 3 (e.g., the greater-than-3 flag is equal to 1), a greater-than-5 flag (e.g., abs_level_gtx_flag[2]) can be decoded. If the greater-than-5 flag for the coefficient indicates that the absolute level is greater than 5 (e.g., the greater-than-5 flag is equal to 1), a greater-than-7 flag (e.g., abs_level_gtx_flag[3]) can be decoded. If the greater-than-7 flag for the coefficient indicates that the absolute level is greater than 7 (e.g., the greater-than-7 flag is equal to 1), a greater-than-9 flag (e.g., abs_level_gtx_flag[4]) can be decoded. The greater-than-9 flag can specify whether the absolute level is greater than 9.

In pass 3, coefficients of the sub-block are scanned. In some embodiments, each coefficient starting from the first scan position of the sub-block to the last scan position of that sub-block is scanned. If the greater-than-9 flag indicates that the absolute level is greater than 9 (e.g., the greater-than-9 flag is equal to 1), a remaining absolute level (e.g., abs_remainder) for the coefficient can be decoded.

In some embodiments, the decoder can receive a video bit-stream.

Figure 9:
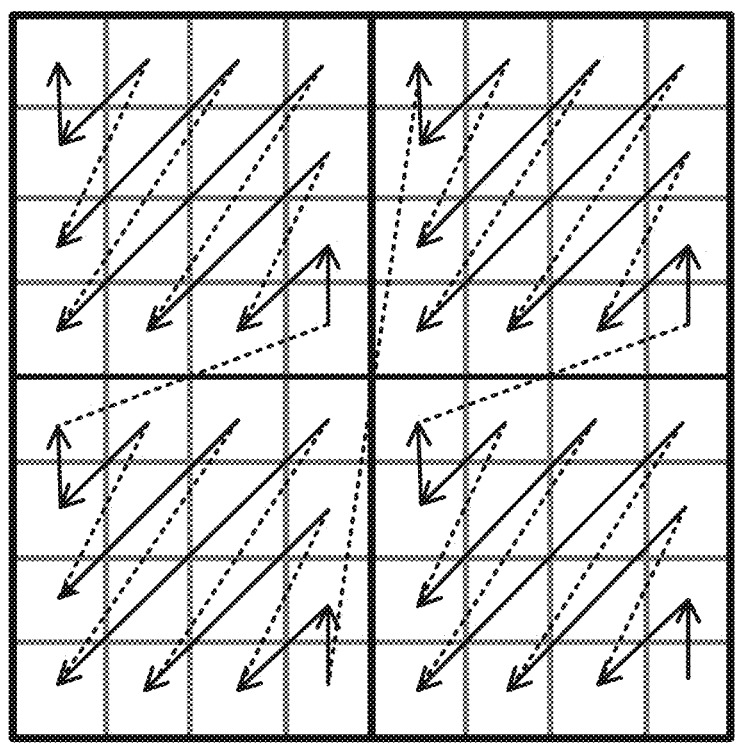
FIG. 9 illustrates an example reverse scanning of an 8×8 transform-skip block, according to some embodiments of the present disclosure.

In some embodiments, the scanning order of the transform-skip residual block can be changed in order to unify the scanning order of the transformed and transform-skip residual coding processes. For example, the scanning order of the transform-skip residual block can be changed from forward scanning to reverse scanning. FIG. 9 illustrates an example reverse scanning of an 8×8 transform-skip block, according to some embodiments of the present disclosure. As shown in FIG. 9, the scanning of the coefficients starts from the coefficient located at the bottom-right corner and ends at the coefficient located at the top-left corner. It is appreciated that the scanning order illustrated in FIG. 9 can be applied by methods shown in FIG. 5 and FIG. 7.

In some embodiments, the reverse scanning can be executed after the transform block is flipped. FIGS. 10A and 10B illustrate an example flipping of an 8×8 block, according to some embodiments of the present disclosure. As shown in FIGS. 10A and 10B, after flipping the block, the position of the top-left residual coefficient is moved to the bottom-right position. After a block is flipped, the reverse scanning (e.g., reverse scanning of FIG. 9) can be executed.

Figure 11:
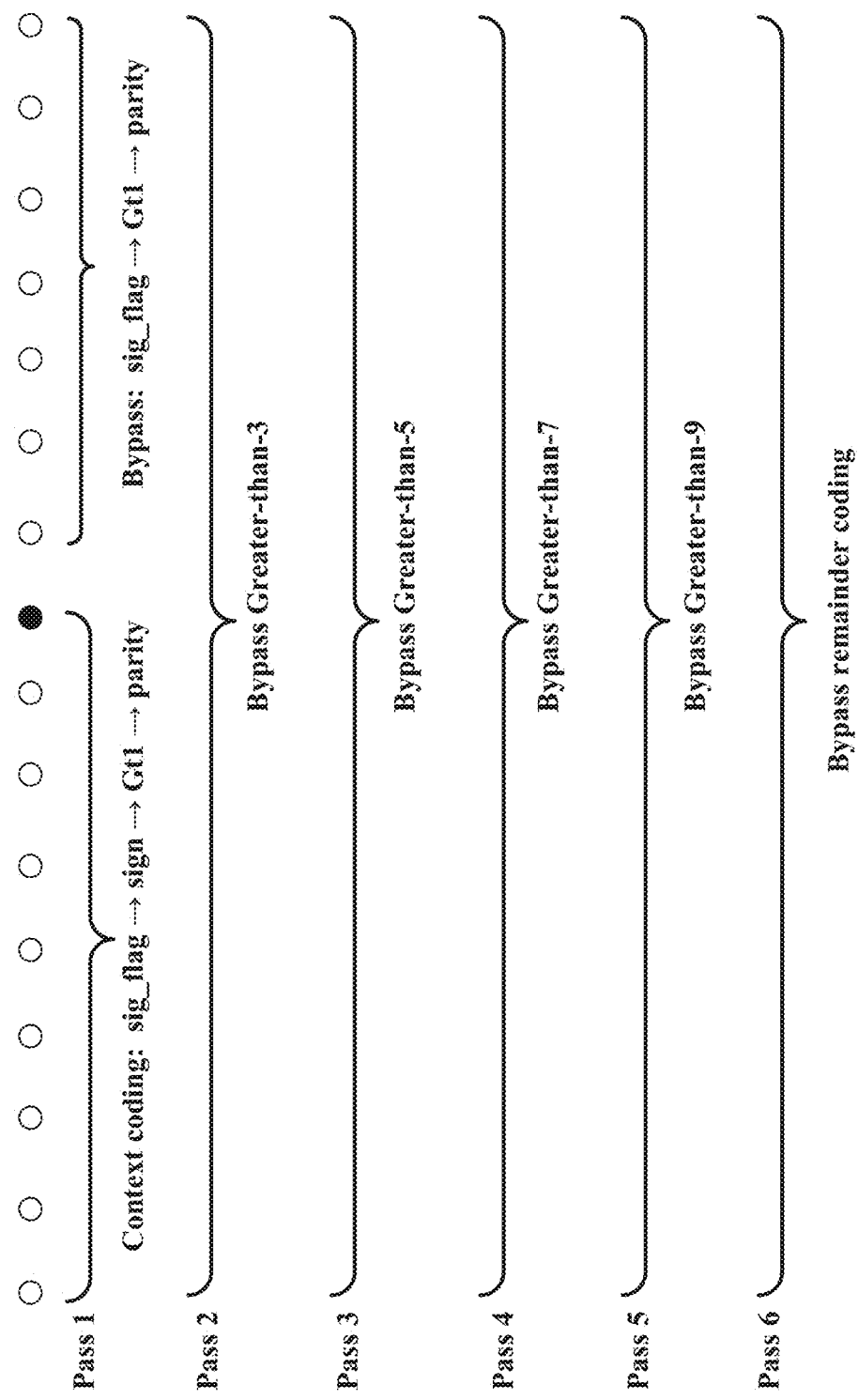
FIG. 11 illustrates an example multi-pass coding, according to some embodiments of the present disclosure.

In some embodiments, the bypass coding can be executed in multiple passes. FIG. 11 illustrates an example multi-pass coding, according to some embodiments of the present disclosure. In some embodiments, the multi-pass coding shown in FIG. 11 can be executed in VVC (e.g., VVC 5). It can be assumed that the number of context coded bins in FIG. 11 has reached a maximum limit at the position of the first pass (shown as the black dot in FIG. 11). As shown in FIG. 11, the flags (e.g., greater-than-3 flag, greater-than-5 flag, greater-than-7 flag, greater-than-9 flag, etc.) can be bypass coded in multiple coding passes.

Figure 12:
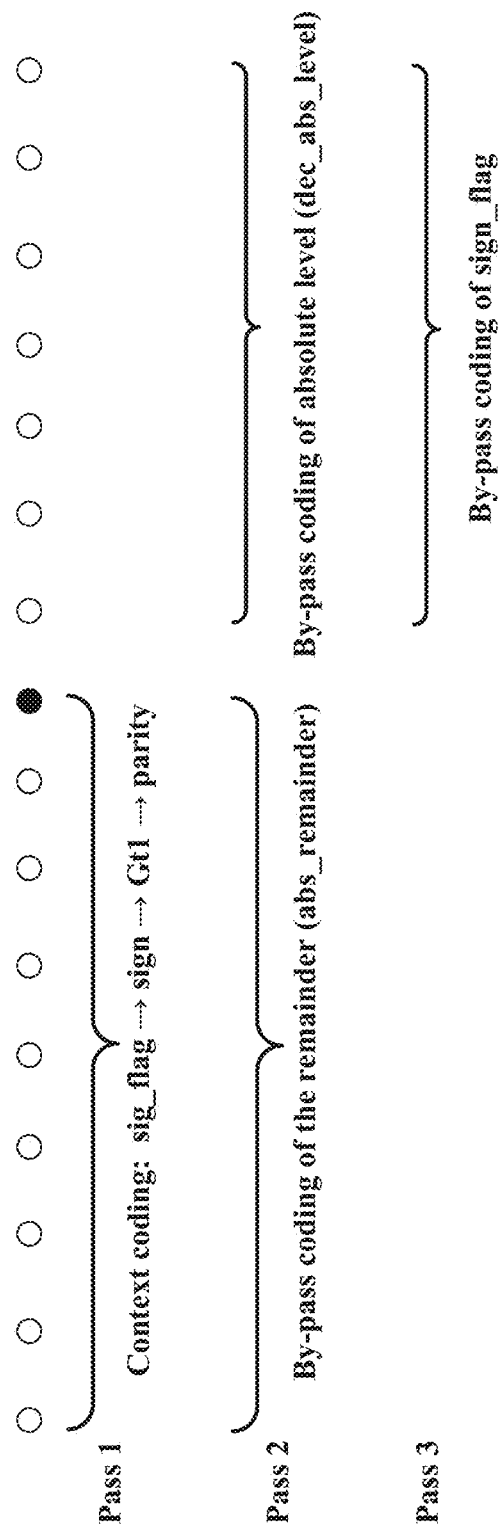
FIG. 12 illustrates an example single pass bypass coding method for an absolute value of a level, according to some embodiments of the disclosure.

In some embodiments, a single pass bypass coding for the absolute values of the level can be achieved. FIG. 12 illustrates an example single pass bypass coding method for an absolute value of a level, according to some embodiments of the disclosure. As shown in FIG. 12, once the context coded bins reach maximum limits (e.g., shown as a black dot in FIG. 12), the CABAC engine can start bypass coding of the remainder of the absolute level using Golomb-Rice coding.

FIG. 13 illustrates an example look-up table for Rice parameters, according to some embodiments of the present disclosure. According to FIG. 13, Rice parameters can be represented by a variable cRiceParam. The location of sum absolute can be represented by a variable locSumAbs.

In some embodiments, a Rice parameter (e.g., cRiceParam) can be derived in the following way. Given an array AbsLevel[x][y] for a transform-skip block, a top-left luma location (x0, y0), and a current coefficient scan location (xC, yC), assuming minLevel is a minimum bypass coded value, if none of the flags of a coefficient is context coded, minLevel for that coefficient is 0. If all of the flags are context coded, minLevel is equal to 10.

In some embodiments, the variable locSumAbs can be derived as specified by the following pseudo code:

$$locSumAbs = 0$$

$$\text{if } (xC > 0)$$

$$locSumAbs \mathrel{+}= AbsLevel[xC - 1][yC]$$

$$\text{if } (yC > 0)$$

$$locSumAbs \mathrel{+}= AbsLevel[xC][yC - 1]$$

$$locSumAbs \mathrel{+}= (10 - minLevel)$$

$$locSumAbs = Clip3(0, 31, LocSumAbs)$$

In some embodiments, the single pass bypass coding can be combined with the method shown in FIG. 7. For example, FIG. 14 illustrates an example method of transform-skip residual coding with the number of coding passes reduced to 3 combined with a single pass bypass coding, according to some embodiments of the present disclosure. The method in FIG. 14 comprises 3 passes.

In pass 1 (step 1402), coefficients of a sub-block are scanned. In some embodiments, each coefficient starting from first scan position of the sub-block to the last scan position is scanned. For each coefficient, the following can be performed if the remaining number of context coded bins are larger than or equal to a group limit. For example, in some embodiments, it is more efficient to code all of the flags in the group using either context coding or bypass coding. As a result, if the number of context coded bins is less than the group limit, it is more efficient to code all the remaining flags using bypass coding, instead of coding some of the remaining flags using context coding and others using bypass coding. In this example, there can be 4 flags that are coded in a group in pass 1 (e.g., significance flag, signal coefficient sign flag, greater-than-1 flag, and greater-than-3 flag). Therefore, given the group limit of 4, the following can be performed for each coefficient if the remaining number of context coded bins are larger than or equal to 4. If a significance flag (e.g., sig_coeff_flag) indicates that the level is a non-zero value (e.g., the significance flag is equal to 1), a signal coefficient sign flag (e.g., coeff_sign_flag) and a greater-than-1 flag (e.g., abs_level_gtx_flag[0]) can be coded. If the greater-than-1 flag indicates that the absolute level is greater than 1 (e.g., the greater-than-1 flag is equal to 1), a greater-than-3 flag (e.g., abs_level_gtx_flag[1]) can be coded. In some embodiments, the coefficients can be scanned until the context coded bins reach maximum limits (e.g., the black dot in FIG. 12), and then the scanning stops at a position as the last position of the first pass.

After the end of pass 1 and prior to the beginning of pass 2, a first pass bypass position variable (e.g., iFirstPassBypassPos) can be set according to the last position of the previous pass (step 1404). In some embodiments, the first pass bypass position variable can be set to the last position of the previous pass plus 1.

In pass 2 (step 1406), coefficients starting from the first scan position of a sub-block to iFirstPassBypassPos can be scanned. For each coefficient, the following can be performed if the remaining number of context coded bins are larger than or equal to a group limit. For example, the group limit can be 3 (e.g., greater-than 5 flag, greater-than-7 flag, and greater-than-9 flag). If greater-than-3 flag indicates that the absolute level is greater than 3 (e.g., the greater-than-3 flag is equal to 1), a greater-than-5 flag (e.g., abs_level_gtx_flag[2]) can be coded. If the greater-than-5 flag indicates that the absolute level is greater than 5 (e.g., greater-than-5 flag is equal to 1), a greater-than-7 flag (e.g., abs_level_gtx_flag[3]) can be coded. If the greater-than-7 flag indicates that the absolute level is greater than 7 (e.g., greater-than-7 flag is equal to 1), a greater-than-9 flag (e.g., abs_level_gtx_flag[4]) can be coded.

After the end of pass 2 and prior to the beginning of pass 3, a second pass bypass position variable (e.g., iSecondPassBypassPos) is set according to the last position of the previous pass (step 1408). In some embodiments, the second pass bypass position variable can be set to the last position of the previous pass plus 1.

In pass 3(a) (step 1410), coefficients starting from the first scan position of a sub-block to iFirstPassBypassPos can be scanned. The following can be performed for each coefficient. If the greater-than-1 flag indicates that the absolute level is greater than 1 (e.g., the greater-than-1 flag is equal to 1), a parity level flag (e.g., par_level_flag) can be bypass coded. If the greater-than-9 flag indicates that the absolute level is greater than 9 (e.g., the greater-than-9 flag is equal to 1), coding of a remaining absolute level (e.g., abs_remainder) can be processed by the non-binary syntax element which is binarized with Golomb-Rice code. The resulting bins can be coded in the bypass mode of the arithmetic coding engine.

In pass 3(b) (step 1412), coefficients starting from iFirstPassBypassPos to the last scan position can be scanned. For each coefficient, coding of absolute level (e.g., dec_abs_level) can be processed by the non-binary syntax element which is binarized with Golomb-Rice code. The resulting bins can be coded in the bypass mode of the arithmetic coding engine. The signal coefficient sign flag can also be coded.

In some embodiments, in pass 3(b), coefficients starting from iFirstPassBypassPos to the last scan position can be scanned, and coding of absolute level (e.g., dec_abs_level) can processed by two steps for each coefficient. First, whether the dec_abs_level is zero or not is signaled. If dec_abs_level is non-zero, the non-binary syntax element which is binarized with Golomb-Rice code and the resulting bins can be coded in the bypass mode of the arithmetic coding engine. The signal coefficient sign flag can also be coded.

FIG. 15 illustrates an example pseudocode including syntax of bypass coding combined with the method in FIG. 14, according to some embodiments of the present disclosure. Some portions of the pseudocode in FIG. 15 are italicized, indicating the processing of the greater-than-3 flag, the greater-than-5 flag, the greater-than-7 flag, the greater-than-9 flag, and the parity level flag.

In some embodiments, a two-pass coding method can be used. For example, all of the flags can be context coded in pass 1, and Golomb-Rice coding can be used for bypass coding in pass 2. FIG. 16 illustrates an example method of transform-skip residual coding with a first pass for context coding and a second pass for Golomb-Rice coding, according to some embodiments of the present disclosure. The method in FIG. 16 comprises 2 passes.

In pass 1 (step 1602), coefficients of a sub-block are scanned. In some embodiments, each coefficient starting from a first scan position of a sub-block to a last scan position is scanned. For each coefficient, the following can be performed if the remaining number of context coded bins is equal to or larger than 8. A significance flag (e.g., sig_coeff_flag) can be context coded. If the significance flag indicates that the level is non-zero (e.g., the significance flag is equal to 1), a coefficient sign flag (e.g., coeff_sign_flag) and a greater-than-1 flag (e.g., abs_level_gtx_flag[0]) can be signaled. If the greater-than-1 flag indicates that the absolute level is greater than 1 (e.g., the greater-than-1 flag is equal to 1), a parity level flag (e.g., par_level_flag) and a greater-than-3 flag (e.g., abs_level_gtx_flag[1]) can be coded. The parity level flag can specify the parity of the absolute level minus 2. The greater-than-3 flag can specify whether the absolute level is greater than 3. If the greater-than-3 flag indicates that the absolute level is greater than 3 (e.g., the greater-than-3 flag is equal to 1), a greater-than-5 flag (e.g., abs_level_gtx_flag[2]) can be coded. If the greater-than-5 flag indicates that the absolute level is greater than 5 (e.g., the greater-than-5 flag is equal to 1), a greater-than-7 flag (e.g., abs_level_gtx_flag[3]) can be coded. If the greater-than-7 flag indicates that the absolute level is greater than 7 (e.g., the greater-than-7 flag is equal to 1), a greater-than-9 flag (e.g., abs_level_gtx_flag[4]) can be coded. The greater-than-9 flag can specify whether the absolute level of the level is greater than 9. In some embodiments, the coefficients can be scanned until the context coded bins reach maximum limits (e.g., the black dot in FIG. 12), and then the scanning stops at a position as the last position of the first pass.

After the end of pass 1 and prior to the beginning of pass 2, a first pass bypass position variable (iFirstPassBypassPos) can be set according to the last position of the previous pass (step 1604). In some embodiments, the first pass bypass position variable can be set to the last position of the previous pass plus 1. The first pass bypass position variable can represent a start position from which an absolute level (e.g., dec_abs_level) syntax is signaled. Coefficients whose scan position is less than the first pass bypass position can be partially signaled through the context coding in pass 1 and the remaining coefficients can be signaled in pass 2(a). In some embodiments, if the scan position of a coefficient is greater than or equal to the first pass bypass position variable, none of the flags of that coefficient is context coded, and the full coefficient and sign can be signaled using bypass coding of pass 2(b).

In pass 2(a) (step 1606), coefficients starting from the first scan position of the sub-block to a location of the first pass bypass position variable minus 1 can be scanned. The following can be performed for each coefficient. If the greater-than-9 flag indicates that the absolute level is greater than 9 (e.g., the greater-than-9 flag is equal to 1), the remaining absolute level (e.g., abs_remainder) can be binarized using Golomb-Rice code, and the resulting bins can be coded in a bypass mode of the arithmetic coding engine.

In pass 2(b) (step 1608), coefficients starting from the first pass bypass position to the last scan position can be scanned. The following can be performed for each coefficient. An absolute level (e.g., dec_abs_level) can be binarized with Golomb-Rice code, and the resulting bins can be coded in the bypass mode of the arithmetic coding engine. If the absolute level is not equal to 0, a coefficient sign flag (e.g., coeff_sign_flag) can be bypass coded.

It is appreciated that the method of FIG. 16 can be implemented by an encoder (e.g., encoder of FIG. 1). In some embodiments, the encoder can receive video frames. It is appreciated that the encoded video frame from the method of FIG. 17 can be decoded using a decoder (e.g., decoder of FIG. 2). In some embodiments, the decoding method can comprise 2 passes.

In pass 1, coefficients of a sub-block are scanned. In some embodiments, each coefficient starting from a first scan position of a sub-block to a last scan position is scanned. For each coefficient, the following can be performed if the remaining number of context coded bins is equal to or larger than a group limit. For example, the group limit can be 8, indicating the number of different flags to be coded in pass 1 (e.g., significance flag, coefficient sign flag, greater-than-1 flag, parity level flag, greater-than-3 flag, greater-than-5 flag, greater-than-7 flag, and greater-than-9 flag). A significance flag (e.g., sig_coeff_flag) can be context decoded. If the significance flag indicates that the level is non-zero (e.g., the significance flag is equal to 1), a coefficient sign flag (e.g., coeff_sign_flag) and a greater-than-1 flag (e.g., abs_level_gtx_flag[0]) can be signaled. If the greater-than-1 flag indicates that the absolute level is greater than 1 (e.g., the greater-than-1 flag is equal to 1), a parity level flag (e.g., par_level_flag) and a greater-than-3 flag (e.g., abs_level_gtx_flag[1]) can be decoded. The parity level flag can specify the parity of the absolute level minus 2. The greater-than-3 flag can specify whether the absolute level is greater than 3. If the greater-than-3 flag indicates that the absolute level is greater than 3 (e.g., the greater-than-3 flag is equal to 1), a greater-than-5 flag (e.g., abs_level_gtx_flag[2]) can be decoded. If the greater-than-5 flag indicates that the absolute level is greater than 5 (e.g., the greater-than-5 flag is equal to 1), a greater-than-7 flag (e.g., abs_level_gtx_flag[3]) can be decoded. If the greater-than-7 flag indicates that the absolute level is greater than 7 (e.g, the greater-than-7 flag is equal to 1), a greater-than-9 flag (e.g., abs_level_gtx_flag[4]) can be decoded. The greater-than-9 flag can specify whether the absolute level of the level is greater than 9. In some embodiments, the coefficients can be scanned until the context coded bins reach maximum limits (e.g., the black dot in FIG. 12), and then the scanning stops at a position as the last position of the first pass.

After the end of pass 1 and prior to the beginning of pass 2, a first pass bypass position variable (iFirstPassBypassPos) can be set according to the last position of the previous pass. In some embodiments, the first pass bypass position variable can be set to the last position of the previous pass plus 1. The first pass bypass position variable can represent a start position from which an absolute level (e.g., dec_abs_level) syntax is signaled. Coefficients whose scan position is less than the first pass bypass position can be partially signaled through the context coding in pass 1 and the remaining coefficients can be signaled in pass 2(a). In some embodiments, if the scan position of a coefficient is greater than or equal to the first pass bypass position variable, none of the flags of that coefficient is context decoded, and the full coefficient and sign can be signaled using bypass decoding of pass 2(b).

In pass 2(a), coefficients starting from the first scan position of the sub-block to a location of the first pass bypass position variable minus 1 can be scanned. The following can be performed for each coefficient. If the greater-than-9 flag indicates that the absolute level is greater than 9 (e.g., the greater-than-9 flag is equal to 1), the binarized remaining absolute level (e.g., abs_remainder) can be can be decoded using Golomb-Rice code, and the resulting bins can be decoded in a bypass mode of the arithmetic coding engine.

In pass 2(b), coefficients starting from the first pass bypass position to the last scan position can be scanned. The following can be performed for each coefficient. A binarized absolute level (e.g., dec_abs_level) can be decoded with Golomb-Rice code, and the resulting bins can be decoded in the bypass mode of the arithmetic coding engine. If the absolute level is not equal to 0, a coefficient sign flag (e.g., coeff_sign_flag) can be bypass decoded.

FIG. 17 illustrates an example pseudocode including syntax of the bypass coding of the method in FIG. 16, according to some embodiments of the present disclosure. Some portions of the pseudocode in FIG. 17 are italicized, indicating the processing of the first pass bypass position and pass 2(b).

In some embodiments, as shown in FIG. 17, pass 1 is performed only if the remaining number of context coded bins is larger than or equal to 8 (e.g., "MaxCcbs>=8" as shown in FIG. 17). This means that up to 7 context codings in the context coding bin budget may be "wasted," which could harm coding performance. Therefore, in some embodiments, the number of abs_level_gtx_flag[ ] flags may be adjusted in the disclosed two-pass coding method. For example, instead of coding the greater-than-9 flag (e.g., abs_level_gtx_flag[4]), only up to greater-than-7 flag (e.g., abs_level_gtx_flag[3]) is coded. Accordingly, pass 1 can be performed only if the remaining number of context coded bins is equal to or greater than 7. In some embodiments, only up to greater-than-5 flag (abs_level_gtx_flag[2]) can be coded. Accordingly, pass 1 is performed only if the remaining number of context coded bins is equal to or larger than 6. It is appreciated that the number of abs_level_gtx_flag[ ] flags may be adjusted to any number. Adjusting the number of abs_level_gtx_flag[ ] flags can allow more positions to be coded in the first coding pass, thus providing better coding efficiency.

In some embodiments, the Rice parameter cRiceParam can be derived in the following manner. Given an array TransCoeffLevel[xC][yC] as the coefficient value at a scan location (xC, yC) and a value minLevel as a minimum bypass coded value, if none of the flags of a coefficient is context coded, minLevel for that coefficient is 0. If all of the flags are context coded, minLevel is equal to 10. The variable locSumAbs can be derived as specified by the following pseudo code:

$$locSumAbs = 0$$

$$\text{if } (xC > 0)$$

$$locSumAbs \mathrel{+}= Abs(TransCoeffLevel[xC - 1][yC])$$

$$\text{if } (yC > 0)$$

$$locSumAbs \mathrel{+}= Abs(TransCoeffLevel[xC][yC - 1])$$

$$locSumAbs = locSumAbs - 2 * minLevel)$$

$$locSumAbs = Clip3(0, 31, LocSumAbs)$$

FIG. 18 illustrates an example look-up table for Rice parameters when minimum bypass coded value is equal to 0, according to some embodiments of the present disclosure. As shown in FIG. 18, Rice parameters can be represented by a variable cRiceParam. The location of sum absolute can be represented by a variable locSumAbs.

In some embodiments, two separate look-up tables can be used for Rice parameter derivations based on minLevel. If minLevel is equal to 0, the table shown in FIG. 18 can be used. If minLevel is not equal to 0, the table shown in FIG. 13 can be used.

In some embodiments, the derivation of Rice parameter does not require any look-up table. For example, the cRiceParam can be derived as follows:

$$cRiceParam = (locSumAbs + \text{offset}) \gg 3$$

In the above equation, the offset can be a predefined constant and can be determined by offline training. One example of the offset value is 4.

In some embodiments, the offset value depends on the color component. For example, the offset value can be 4 for luma and 0 for chroma.

In some embodiments, the offset value depends on the frame type. For example, the offset value can be 4 for intra frame and 0 for inter frame.

In some embodiments, in VVC (e.g., VVC 7), transform skip mode is allowed for both luma and chroma components, and both types of components can share the same context variables. A context variable can be a variable specified for the adaptive binary arithmetic decoding process of a bin by an equation containing recently decoded bins. However, the signal statistics of luma and chroma blocks may be different. As a result, in some embodiments of the present disclosure, different context variables can be used for luma and chroma components. The syntax elements affected by the proposed expansion of context models can include a significance coefficient flag (e.g., sig_coeff_flag), abs_level_gtx_flag[n][j] (e.g., j=0 to 4), a parity flag (e.g., par_level_flag), a signal coefficient sign flag (e.g., coeff_sign_flag), and coded_sub_block_flag (e.g., coded_sub_block_flag shown in FIG. 3).

In VVC (e.g., VVC 7), 3 context variables can be used to code sig_coeff_flag of the transform skip mode. In some embodiments, a total of 6 context variables (e.g., 3 for luma and 3 for chroma) can be used to code sig_coeff_flag of the transform skip mode. The context index for coding the sig_coeff_flag of the transform skip mode can be derived from the number of significant coefficients of neighbors (e.g., top and left neighbors). In some embodiments, the context index can refer to the identifiers of a context variable. For example, if there are 6 context variables available, the context index of the first context variable can be 0, the context index of the second context variable can be 1, etc. Input to this process can be the color component index cIdx, the luma location (x0, y0), and the current coefficient scan location (xC, yC). The luma location (x0, y0) can specify a specific sample (e.g., a top-left sample) of the current transform block relative to the specific sample (e.g., top-left sample) of the current picture. The output of this process can be the coding index variable ctxInc. In some embodiments, the variable ctxInc can be derived according to the following pseudocode:

$$locNumSig = 0$$

$$\text{if } (xC > 0)$$

$$locNumSig \mathrel{+}= sig\_coeff\_flag[xC - 1][yC]$$

$$\text{if } (yC > 0)$$

$$locNumSig \mathrel{+}= sig\_coeff\_flag[xC][yC - 1]$$

if (cIdx == 0) // e.g., luma component, ctxInc can be derived as:

$$ctxInc = locNumSig$$

else // e.g., chroma component, ctxInc can be derived as:

$$ctxInc = locNumSig + 3$$

In VVC (e.g., VVC 7), 4 context variables can be used to code abs_level_gtx_flag[n][0] of the transform skip mode. In some embodiments, a total of 8 context variables (4 for luma and 4 for chroma) can be used to code abs_level_gtx_flag[n][0] of the transform skip mode. The context index for coding abs_level_gtx_flag[n][0] of the transform skip can be derived from the number of significant coefficients of neighbors (e.g., top and left neighbors). Input to this process can be the color component index cIdx, the luma location (x0, y0), and the current coefficient scan location (xC, yC). The luma location (x0, y0) can specify the specific sample (e.g., top-left sample) of the current transform block relative to the specific sample (e.g., top-left sample) of the current picture. The output of this process can be the coding index variable ctxInc. In some embodiments, the variable ctxInc can be derived according to the following pseudocode:

$$\text{if } (BdpcmFlag[x0][y0][cIdx] == 1)$$
$$ctxInc = 3$$
$$\text{else if } (xC > 0 \text{ and } yC > 0)$$
$$ctxInc = \text{sig\_coeff\_flag}[xC-1][yC] + \text{sig\_coeff\_flag}[xC][yC-1]$$
$$\text{else if } (xC > 0)$$
$$ctxInc = \text{sig\_coeff\_flag}[xC-1][yC]$$
$$\text{else if } (yC > 0)$$
$$ctxInc = \text{sig\_coeff\_flag}[xC][yC-1]$$
$$\text{else}$$
$$ctxInc = 0$$
$$\text{if } (cIdx > 0)$$
$$ctxInd = ctxInc + 4$$

In VVC (e.g., VVC 7), 1 context variable can be used to code par_level_flag of the transform skip mode. In some embodiments, a total of 2 context variables (1 for luma and 1 for chroma) can be used to code par_level_flag of the transform skip mode. The context index for coding par_level_flag of the transform skip can be derived in the following manner. The input to this process can be the color component index cIdx. The output of this process is the coding index variable ctxInc. In some embodiments, the variable ctxInc can be derived according to the following pseudocode:

$$\text{if } (cIdx == 0)$$
$$ctxInc = 0$$
$$\text{else}$$
$$ctxInc = 1$$

In some embodiments, separate context variables for luma and chroma can be used to code abs_level_gtx_flag of the transform skip mode. The context index for coding abs_level_gtx_flag of the transform skip can be derived in the following manner. The input to this process can be the color component index cIdx. The output of this process can be the coding index variable ctxInc. In some embodiments, the variable ctxInc can be derived in the following manner: the context index of the syntax element abs_level_gtx_flag [n][j] with j>0 are derived as ctxInc=j−1; and for chroma component (e.g., cIdx greater than 0), the context index is incremented as ctxInc=ctxInc+4.

In VVC (e.g., VVC 7), 6 context variables can be used to code coeff_sign_flag of the transform skip mode. In some embodiments, a total of 12 context variables (6 for luma and 6 for chroma) can be used to code coeff_sign_flag of the transform skip mode. The context index for coding the coeff_sign_flag of the transform skip mode can be derived from the coeff_sign_flag of neighbors (e.g., top and left neighbors). Input to this process can be the color component index cIdx, the luma location (x0, y0), and the current coefficient scan location (xC, yC). The luma location (x0, y0) can specify the specific sample (e.g., top-left sample) of the current transform block relative to the specific sample (e.g., top-left sample) of the current picture. The output of this process can be the coding index variable ctxInc. In some embodiments, variables leftSign and aboveSign can be derived according to the following pseudocode:

$$\text{if } (xC == 0)$$
$$leftSign = 0$$
$$\text{else}$$
$$leftSign = CoeffSignLevel[xC-1][yC]$$
$$\text{if } (yC == 0)$$
$$aboveSign = 0$$
$$\text{else}$$
$$aboveSign = CoeffSignLevel[xC][yC-1]$$

In some embodiments, the variable ctxInc can be derived according to the following pseudocode:

$$\text{if } (leftSign == 0 \text{ and } aboveSign == 0) \text{ or } (leftSign == aboveSign)$$
$$\text{if } (BdpcmFlag[x0][y0][cIdx] == 0)$$
$$ctxInd = 0$$
$$\text{else}$$
$$ctxInc = 3$$
$$\text{else if } (leftSign >= 0 \text{ and } aboveSign >= 0)$$
$$\text{if } BdpcmFlag[x0][y0][cIdx])$$
$$ctxInc = 1$$
$$\text{else}$$
$$cyxInc = 4$$
$$\text{else}$$
$$\text{if } (BdpcmFlag[x0][y0][cIdx])$$
$$ctxInc = 2$$
$$\text{else}$$
$$ctxInc = 5$$
$$\text{if } (cIdx > 0)$$
$$ctxInc = ctxInc + 6$$

In VVC (e.g., VVC 7), 3 context variables can be used to code coded_sub_block_flag of the transform skip mode. The coded_sub_block_flag can be a sub-block flag that specifies whether the transform coefficient levels in the sub-block are equal to 0. For example, if the coded_sub_block_flag[xS][yS] is equal to 0, the transform coefficient levels of the subblock at location (xS, yS) are inferred to be equal to 0.

If coded_sub_block_flag[xS][yS] is equal to 1, at least one of the transform coefficient levels of the sub-block at location (xS, yS) has a non-zero value. In some embodiments, a total of 6 context variables (3 for luma and 3 for chroma) can be used to code coded_sub_block_flag of the transform skip mode. The context index for coding the coded_sub_block_flag of the transform skip mode can be derived from the coded_sub_block_flag of top and left neighbors. Input to this process can be the color component index cIdx, the luma location (x0, y0), the current sub-block scan location (xS, yS), the previously decoded bins of the syntax element coded_sub_block_flag, the binary logarithm of the transform block width log 2TbWidth, and the transform block height log 2TbHeight. The luma location (x0, y0) can specify the top-left sample of the current transform block relative to the top-left sample of the current picture. The output of this process can be the coding index variable ctxInc. In some embodiments, the variables log 2SbWidth and log 2SbHeight can be derived according to the following pseudocode:

$$\text{if } (\text{minimum } (\log2TbWidth, \log2TbHeight) < 2)$$
$$\log2SbWidth = 1$$
$$\text{else}$$
$$\log2SbHeight = \log2SbWidth$$

In some embodiments, the variables log 2SbWidth and log 2SbHeight can be modified according to the following pseudocode:

$$\text{if } \left(\log2TbWidth < 2 \text{ and } cIdx == 0\right)$$
$$\log2SbWidth = \log2TbWidth$$
$$\log2SbHeight = 4 - \log2SbWidth$$
$$\text{else if } \left(\log2TbHeight < 2 \text{ and } cIdx == 0\right)$$
$$\log2SbHeight = \log2TbHeight$$
$$\log2SbWidth = 4 - \log2SbHeight$$

In some embodiments, a variable csbfCtx can be initialized as 0 and modified according to the following pseudocode:

$$\text{if } (xS > 0)$$
$$csbfCtx = csbfCtx + \text{coded\_sub\_block\_flag}[xS - 1][yS]$$
$$\text{if } (yS > 0)$$
$$csbfCtx = csbfCtx + \text{coded\_sub\_block\_flag}[xS][yS - 1]$$

In some embodiments, the context index variable ctxInc can be derived using the color component index cIdx and csbfCtx according to the following pseudocode:

$$\text{if } \left(cIdx == 0\right)$$
$$ctxInc = csbfCtx$$
$$\text{else}$$
$$ctxInc = 3 + csbfCtx$$

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A coding method implemented by an encoder of video data, the method comprising:
   performing a first pass of scanning a transform coefficient of a sub-block of a video frame, wherein the first pass of scanning comprises:
       bypass coding a parity level flag for the transform coefficient, the parity level flag indicating a parity of an absolute value of a level of the transform coefficient.

2. The coding method of clause 1, further comprising:
   before the first pass of scanning, performing a second pass of scanning the transform coefficient, wherein the second pass of scanning comprises:
       coding a greater-than-1 flag, wherein the greater-than-1 flag indicates whether the absolute value is greater than 1;
   wherein the first pass of scanning further comprises:
       bypass coding the parity level flag in response to the greater-than-1 flag indicating that the absolute value is greater than 1.

3. The coding method of clause 2, wherein the sub-block has a plurality of transform coefficients, and performing the second pass of scanning further comprises:
   scanning the plurality of transform coefficients until a number of context coded bins reaches a maximum limit; and
   in response to the number of context coded bins reaching the maximum limit, bypass coding absolute values of levels of transform coefficients that are unscanned in the second pass, wherein the bypass coding comprises binarizing the absolute values of the unscanned transform coefficients using Golomb-Rice coding.

4. The coding method of clause 2 or 3, wherein the second pass of scanning further comprises:
   coding a significance flag for the transform coefficient, the significance flag indicating whether the level of the transform coefficient is zero; and
   coding the greater-than-1 flag in response to the significance flag indicating that the level of the transform coefficient is not zero.

5. The coding method of any one of clauses 2-4, wherein the second pass of scanning further comprises:
   coding a greater-than-3 flag for the transform coefficient in response to the greater-than-1 flag indicating that the absolute value is greater than 1, the greater-than-3 flag indicating whether the absolute value is greater than 3.

6. The coding method of clause 5, further comprising:
   after the second pass of scanning and before the first pass of scanning, performing a third pass of scanning the transform coefficient, wherein the third pass of scanning comprises:
       coding a greater-than-5 flag for the transform coefficient in response to the greater-than-3 flag indicating that the absolute value is greater than 3, the greater-than-5 flag indicating whether the absolute value is greater than 5;
       coding a greater-than-7 flag for the transform coefficient in response to the greater-than-5 flag indicating that the absolute value is greater than 5, the greater-than-7 flag indicating whether the absolute value is greater than 7; and
       coding a greater-than-9 flag for the transform coefficient in response to the greater-than-7 flag indicating that the absolute value is greater than 7, the greater-than-9 flag indicating whether the absolute value is greater than 9.

7. The coding method of clause 6, wherein the first pass of scanning further comprises:
   coding a remaining absolute level flag for the transform coefficient in response to the greater-than-9 flag indicating that the absolute value is greater than 9, the remaining absolute level flag indicating a remaining absolute value of the level of the transform coefficient.

8. The coding method of clause 2, further comprising:
   after the second pass of scanning and before the first pass of scanning, performing a third pass of scanning the transform coefficient, wherein the third pass of scanning further comprises:
       coding a greater-than-3 flag for the transform coefficient in response to the greater-than-1 flag indicating that the absolute value is greater than 1, the greater-than-3 flag indicating whether the absolute value is greater than 3.

9. The coding method of clause 8, wherein the third pass of scanning further comprises:
   coding a greater-than-5 flag for the transform coefficient in response to the greater-than-3 flag indicating that the absolute value is greater than 3, the greater-than-5 flag indicating whether the absolute value is greater than 5;
   coding a greater-than-7 flag for the transform coefficient in response to the greater-than-5 flag indicating that the absolute value is greater than 5, the greater-than-7 flag indicating whether the absolute value is greater than 7; and
   coding a greater-than-9 flag for the transform coefficient in response to the greater-than-7 flag indicating that the absolute value is greater than 7, the greater-than-9 flag indicating whether the absolute value is greater than 9.

10. The coding method of clauses 9, wherein the first pass of scanning further comprises:
    coding a remaining absolute level flag for the transform coefficient in response to the greater-than-9 flag indicating that the absolute value is greater than 9, the remaining absolute level flag indicating a remaining absolute value of the level of the transform coefficient.

11. The coding method of any one of clauses 1-10, wherein the sub-block has a plurality of transform coefficients, and the first pass of scanning is performed by scanning the plurality of transform coefficients in a reverse order.

12. The coding method of clause 11, further comprising:
    flipping the plurality of transform coefficients prior to performing the first pass of scanning.

13. The coding method of any one of clauses 1-12, wherein the coding method is a transform-skip residual coding method.

14. The coding method any one of clauses 1-13, further comprising:
    receiving the video frame; and
    splitting the video frame into a plurality of sub-blocks.

15. A decoding method implemented by a decoder of video data, the method comprising:
    performing a first pass of scanning a transform coefficient of a sub-block of a video frame, wherein the first pass of scanning comprises:
        bypass decoding a parity level flag for the transform coefficient, the parity level flag indicating a parity of an absolute value of a level of the transform coefficient.

16. The decoding method of clause 15, further comprising:

before the first pass of scanning, performing a second pass of scanning the transform coefficient, wherein the second pass of scanning comprises:
  decoding a greater-than-1 flag, wherein the greater-than-1 flag indicates whether the absolute value is greater than 1;
wherein the first pass of scanning further comprises:
  bypass decoding the parity level flag in the first pass in response to the greater-than-1 flag indicating that the absolute value is greater than 1.

17. The decoding method of clause 16, wherein the second pass of scanning further comprises:
  decoding a significance flag for the transform coefficient, the significance flag indicating whether the level of the transform coefficient is zero; and
  decoding the greater-than-1 flag in response to the significance flag indicating that the level of the transform coefficient is not zero.

18. The decoding method of clause 16, wherein the first pass of scanning further comprises:
  decoding a greater-than-3 flag for the transform coefficient in response to the greater-than-1 flag indicating that the absolute value is greater than 1, the greater-than-3 flag indicating whether the absolute value is greater than 3;
  decoding a greater-than-5 flag for the transform coefficient in response to the greater-than-3 flag indicating that the absolute value is greater than 3, the greater-than-5 flag indicating whether the absolute value is greater than 5;
  decoding a greater-than-7 flag for the transform coefficient in response to the greater-than-5 flag indicating that the absolute value is greater than 5, the greater-than-7 flag indicating whether the absolute value is greater than 7; and
  decoding a greater-than-9 flag for the transform coefficient in response to the greater-than-7 flag indicating that the absolute value is greater than 7, the greater-than-9 flag indicating whether the absolute value is greater than 9.

19. The decoding method of clause 18, further comprising:
  performing a third pass of scanning the transform coefficient, wherein the third pass of scanning comprises:
    decoding a remaining absolute level flag for the transform coefficient in response to the greater-than-9 flag indicating that the absolute value is greater than 9, the remaining absolute level flag indicating a remaining absolute value of the level of the transform coefficient.

20. The decoding method of clause 15, wherein the sub-block has a plurality of transform coefficients, and the first pass of scanning is performed by scanning the plurality of transform coefficients from a bottom-right corner of the sub-block to a top-left corner of the sub-block.

21. The decoding method of clause 20, further comprising:
  flipping the plurality of transform coefficients prior to performing the first pass of scanning.

22. The decoding method of any one of clauses 15-21, wherein the decoding method is a transform-skip residual decoding method.

23. A system to encode video data, the system comprising:
  a memory storing a set of instructions; and
  a processor configured to execute the set of instructions to cause the system to:
    performing a first pass of scanning a transform coefficient of a sub-block of a video frame, wherein the first pass of scanning comprises:
      bypass coding a parity level flag for the transform coefficient, the parity level flag indicating a parity of an absolute value of a level of the transform coefficient.

24. A system to decode video data, the system comprising:
  a memory storing a set of instructions; and
  a processor configured to execute the set of instructions to cause the system to:
    performing a first pass of scanning a transform coefficient of a sub-block of a video frame, wherein the first pass of scanning comprises:
      decoding a parity level flag for the transform, the parity level flag indicating a parity of an absolute value of a level of the transform coefficient.

25. A coding method implemented by an encoder of video data, the method comprising:
  performing a first pass of scanning transform coefficients of a sub-block of a video frame, wherein:
    the performing of the first pass of scanning is stopped when a number of context coded bins reaches a maximum limit,
    a first set of transform coefficients of the sub-block are scanned in the first pass, and
    the first pass of scanning comprises coding, for each of the first set of transform coefficients, a significance flag indicating whether a level of the transform coefficient is zero; and
  performing a second pass of scanning the transform coefficients of the sub-block, wherein the second pass of scanning comprises:
    binarizing an absolute value of a level for each of a second set of transform coefficients, wherein the second set of transform coefficients are not scanned in the first pass.

26. The coding method of clause 25, wherein the first pass of scanning further comprises:
  coding a greater-than-1 flag for a first transform coefficient in response to the significance flag of the first transform coefficient indicating that a level of the first transform coefficient is not zero, the first transform coefficient being one of the first set of transform coefficients, the greater-than-1 flag indicating whether an absolute value of the level of the first transform coefficient is greater than 1.

27. The coding method of clause 26, wherein the first pass of scanning further comprises:
  coding a greater-than-3 flag for the first transform coefficient in response to the greater-than-1 flag indicating that the absolute value of the level of the first transform coefficient is greater than 1, the greater-than-3 flag indicating whether the absolute value of the level of the first transform coefficient is greater than 3, wherein the performing of the first pass of scanning is stopped when a number of remaining context coded bins is less than a group limit;
  coding a greater-than-5 flag for the first transform coefficient in response to the greater-than-3 flag indicating that the absolute value of the level of the first transform coefficient is greater than 3, the greater-than-5 flag indicating whether the absolute value of the level of the first transform coefficient is greater than 5;
  coding a greater-than-7 flag for the first transform coefficient in response to the greater-than-5 flag indicating that the absolute value of the level of the first transform coefficient is greater than 5, the greater-than-7 flag indicating whether the absolute value of the level of the first transform coefficient is greater than 7; and coding a greater-than-9 flag for the first transform coefficient in response to the greater-than-7 flag indicating that the absolute value of the level of the first transform coefficient is greater than 7, the greater-than-9 flag indicating whether the absolute value of the level of the first transform coefficient is greater than 9.

28. The coding method of clause 27, wherein the second pass of scanning further comprises:

coding a remaining absolute level flag for the first transform coefficient in response to the greater-than-9 flag indicating that the absolute value of the level of the first transform coefficient is greater than 9, wherein the remaining absolute level flag indicates a remaining absolute value of the level of the first transform coefficient.

29. The coding method of any one of clauses 25-28, wherein each of the first pass and the second pass is performed by scanning the transform coefficients of the sub-block in a reverse order.

30. The coding method of clause 29, wherein the method further comprises:

flipping the transform coefficients of the sub-block prior to performing the first pass.

31. The coding method of any one of clauses 25-30, wherein the coding method is a transform-skip residual coding method.

32. The coding method of any one of clauses 25-31, wherein binarizing the absolute value of the level for each of the second set of transform coefficients further comprises:

binarizing the absolute value using Golomb-Rice code.

33. A decoding method implemented by a decoder of video data, the method comprising:

performing a first pass of scanning transform coefficients of a sub-block of a video frame, wherein:

the performing of the first pass of scanning is stopped when a number of context coded bins reaches a maximum limit, a first set of transform coefficients of the sub-block are scanned in the first pass, and the first pass of scanning comprises decoding, for each of the first set of transform coefficients, a significance flag indicating whether a level of the transform coefficient is zero; and performing a second pass of scanning the transform coefficients of the sub-block, wherein the second pass of scanning comprises:

decoding a binarized absolute value of a level for each of a second set of transform coefficients, wherein the second set of transform coefficients are not scanned in the first pass.

34. The decoding method of clause 33, wherein the first pass of scanning further comprises:

decoding a greater-than-1 flag for a first transform coefficients in response to the significance flag of the first transform coefficient indicating that a level of the first transform coefficient is not zero, the first transform coefficient being one of the first set of transform coefficients, the greater-than-1 flag indicating whether an absolute value of the level of the first transform coefficient is greater than 1.

35. The decoding method of clause 34, wherein the first pass of scanning further comprises:

decoding a greater-than-3 flag for the first transform coefficient in response to the greater-than-1 flag indicating that the absolute value of the level of the first transform coefficient is greater than 1, the greater-than-3 flag indicating whether the absolute value of the level of the first transform coefficient being scanned is greater than 3, wherein the performing of the first pass of scanning is stopped when a number of remaining context coded bins is less than a group limit;

decoding a greater-than-5 flag for each of the first transform coefficient in response to the greater-than-3 flag indicating that the absolute value of the level of the first transform coefficient is greater than 3, the greater-than-5 flag indicating whether the absolute value of the level of the first transform coefficient is greater than 5;

decoding a greater-than-7 flag for each of the first transform coefficient in response to the greater-than-5 flag indicating that the absolute value of the level of the first transform coefficient is greater than 5, the greater-than-7 flag indicating whether the absolute value of the level of the first transform coefficient is greater than 7; and decoding a greater-than-9 flag for each of the first transform coefficient in response to the greater-than-7 flag indicating that the absolute value of the level of the first transform coefficient is greater than 7, the greater-than-9 flag indicating whether the absolute value of the level of the first transform coefficient is greater than 9.

36. The decoding method of clause 35, wherein the second pass of scanning further comprises:

decoding a remaining absolute level flag for the first transform coefficient in response to the greater-than-9 flag indicating that the absolute value of the level of the first transform coefficient being scanned is greater than 9, wherein the remaining absolute level flag indicates a remaining absolute value of the level of the first transform coefficient.

37. The decoding method of any one of clauses 33-36, wherein the coding method is a transform-skip residual coding method.

38. The decoding method of any one of clauses 9-13, wherein decoding the binarized absolute value of the level for each of the second set of transform coefficients further comprises:

decoding the absolute value using Golomb-Rice code.

39. A system to encode video data, the system comprising:
a memory storing a set of instructions; and
a processor configured to execute the set of instructions to cause the system to:

perform a first pass of scanning transform coefficients of a sub-block of a video frame, wherein:

the performing of the first pass of scanning is stopped when a number of context coded bins reaches a maximum limit, a first set of transform coefficients of the sub-block are scanned in the first pass, and the first pass of scanning comprises coding, for each of the first set of transform coefficients, a significance flag indicating whether a level of the transform coefficient is zero; and perform a second pass of scanning the transform coefficients of the sub-block, wherein the second pass of scanning comprises:

binarizing an absolute value of a level for each of a second set of transform coefficients, wherein the second set of transform coefficients are not scanned in the first pass.

40. A system to decode video data, the system comprising:
a memory storing a set of instructions; and
a processor configured to execute the set of instructions to cause the system to:

perform a first pass of scanning transform coefficients of a sub-block of a video frame, wherein:
the performing of the first pass of scanning is stopped when a number of context coded bins reaches a maximum limit,
a first set of transform coefficients of the sub-block are scanned in the first pass, and
the first pass of scanning comprises decoding, for each of the first set of transform coefficients, a significance flag indicating whether a level of the transform coefficient is zero; and
perform a second pass of scanning the transform coefficients of the sub-block, wherein the second pass of scanning comprises:
decoding a binarized absolute value of a level for each of a second set of transform coefficients, wherein the second set of transform coefficients are not scanned in the first pass.

41. A coding method implemented by an encoder of video data, the method comprising:
generating a first set of context variables for luma components of a video frame;
generating a second set of context variables for chroma components of the video frame;
generating a sub-block of the video frame; and
coding a first set of transform coefficients of the sub-block according to the first set of context variables and the second set of context variables.

42. The coding method according to clause 41, wherein coding the first set of transform coefficients comprises:
coding a significance flag for a transform coefficient of the first set of transform coefficients according to 3 context variables from the first set of context variables and 3 context variables from the second set of context variables, the significance flag indicating whether a level of the transform coefficient is zero.

43. The coding method according to clause 42, further comprising:
generating the 3 context variables from the first set of context variables and the 3 context variables from the second set of context variables, the generating being based on a color component index, a luma location that specifies a location of the sub-block relative to the video frame, and a current coefficient scan location.

44. The coding method according to any one of clauses 41-43, wherein coding the first set of transform coefficients comprises:
coding greater-than-x flags for a transform coefficient of the first set of transform coefficients according to 4 context variables from the first set of context variables and 4 context variables from the second set of context variables, wherein the greater-than-x flags indicate whether an absolute value of the level of the transform coefficient is greater than a number x.

45. The coding method according to clause 44, further comprising:
generating the 4 context variables from the first set of context variables and the 4 context variables from the second set of context variables, the generating being based on a color component index, a luma location that specifies a location of the sub-block relative to the video frame, and a current coefficient scan location.

46. The coding method according to any one of clauses 41-45, wherein coding the first set of transform coefficients comprises:
coding a parity flag for a transform coefficient of the first set of transform coefficients according to 1 context variable from the first set of context variables and 1 context variable from the second set of context variables, wherein the parity flag indicates a parity of the absolute value of the level of the transform coefficient.

47. The coding method according to clause 46, further comprising:
generating, according to a color component index, the 1 context variable from the first set of context variables and the 1 context variable from the second set of context variables.

48. The coding method according to any one of clauses 41-47, wherein coding the first set of transform coefficients comprises:
coding a coefficient sign flag for a transform coefficient of the first set of transform coefficients according to 6 context variables from the first set of context variables and 6 context variables from the second set of context variables, wherein the coefficient sign flag indicates a sign of the value of the transform coefficient.

49. The method according to clause 48, further comprising:
generating the 6 context variables from the first set of context variables and the 6 context variables from the second set of context variables, the generating being based on a number of significant coefficients of neighbors of the video frame, a luma location that specifies location of the sub-block relative to the video frame, and a current coefficient scan location.

50. The method according to any one of clauses 41-49, wherein coding the first set of transform coefficients comprises:
coding a sub-block flag for a transform coefficient of the first set of transform coefficients according to 3 context variables from the first set of context variables and 3 context variables from the second set of context variables.

51. The method according to clause 50, further comprising:
generating the 3 context variables from the first set of context variables and the 3 context variables from the second set of context variables, the generating being based on a number of significant coefficients of neighbors of the video frame, a luma location that specifies location of the sub-block relative to the video frame, and a current coefficient scan location.

52. A video processing method, comprising:
receiving a video bit-stream;
splitting the video bit-stream into a plurality of sub-blocks;
generating a first set of context variables for luma components of a sub-block;
generating a second set of context variables for chroma components of the sub-block; and
context coding a first set of transform coefficients of the sub-block according to the first set of context variables and the second set of context variables.

53. A decoding method implemented by a decoder of video data, the method comprising:
receiving a video frame;
splitting the video frame into a plurality of sub-blocks;
generating a first set of context variables for luma components of the video frame;
generating a second set of context variables for chroma components of the video frame; and
decoding a first set of transform coefficients of the sub-block according to the first set of context variables and the second set of context variables.

54. The decoding method according to clause 53, wherein decoding the first set of transform coefficients comprises:
decoding a significance flag for a transform coefficient of the first set of transform coefficients according to 3 context variables from the first set of context variables and 3 context variables from the second set of context variables, the significance flag indicating whether a level of the transform coefficient is zero.

55. The decoding method according to clause 54, further comprising:
generating the 3 context variables from the first set of context variables and the 3 context variables from the second set of context variables, the generating being based on a color component index, a luma location that specifies a top-left sample of a current transform block relative to a top-left sample of the video frame, and a current coefficient scan location.

56. The decoding method according to any one of clauses 53-55, wherein decoding the first set of transform coefficients comprises:
decoding greater-than-x flags for a transform coefficient of the first set of transform coefficients according to 4 context variables from the first set of context variables and 4 context variables from the second set of context variables.

57. The decoding method according to clause 56, further comprising:
generating the 4 context variables from the first set of context variables and the 4 context variables from the second set of context variables, the generating being based on a color component index, a luma location that specifies a top-left sample of a current transform block relative to a top-left sample of the video frame, and a current coefficient scan location.

58. The decoding method according to any one of clauses 53-57, wherein decoding the first set of transform coefficients comprises:
decoding a parity flag for a transform coefficient of the first set of transform coefficients according to 1 context variable from the first set of context variables and 1 context variable from the second set of context variables.

59. The decoding method according to clause 58, further comprising:
generating the 1 context variable from the first set of context variables and the 1 context variable from the second set of context variables, the generating being based on a color component index.

60. The decoding method according to any one of clauses 53-59, wherein decoding the first set of transform coefficients comprises:
decoding a context coefficient sign flag for a transform coefficient of the first set of transform coefficients according to 6 context variables from the first set of context variables and 6 context variables from the second set of context variables.

61. The decoding method according to clause 60, further comprising:
generating the 6 context variables from the first set of context variables and the 6 context variables from the second set of context variables, the generating being based on a number of significant coefficients of top and left neighbors of the video frame, a luma location that specifies a top-left sample of a current transform block relative to a top-left sample of the video frame, and a current coefficient scan location.

62. The decoding method according to any one of clauses 53-61, wherein decoding the first set of transform coefficients comprises:
decoding a sub-block flag for a transform coefficient of the first set of transform coefficients according to 3 context variables from the first set of context variables and 3 context variables from the second set of context variables.

63. The decoding method according to clause 62, further comprising:
generating the 3 context variables from the first set of context variables and the 3 context variables from the second set of context variables, the generating being based on a number of significant coefficients of top and left neighbors of the video frame, a luma location that specifies a top-left sample of a current transform block relative to a top-left sample of the video frame, and a current coefficient scan location.

64. A system to encode video data, the system comprising:
a memory storing a set of instructions; and
a processor configured to execute the set of instructions to cause the system to:
generate a first set of context variables for luma components of a video frame;
generate a second set of context variables for chroma components of the video frame;
generate a sub-block of the video frame; and
code a first set of transform coefficients of the sub-block according to the first set of context variables and the second set of context variables.

65. A system to decode video data, the system comprising:
a memory storing a set of instructions; and
a processor configured to execute the set of instructions to cause the system to:
receive a video frame;
split the video frame into a plurality of sub-blocks;
generate a first set of context variables for luma components of the video frame;
generate a second set of context variables for chroma components of the video frame; and
decode a first set of transform coefficients of the sub-block according to the first set of context variables and the second set of context variables.

66. A non-transitory computer readable medium that stores a set of instructions that is executable by one or more processors of an apparatus to cause the apparatus to initiate a method for encoding video data, the method comprising:
performing a first pass of scanning a transform coefficient of a sub-block of a video frame, wherein the first pass of scanning comprises:
bypass coding a parity level flag for the transform coefficient, the parity level flag indicating a parity of an absolute value of a level the transform coefficient.

67. A non-transitory computer readable medium that stores a set of instructions that is executable by one or more processors of an apparatus to cause the apparatus to initiate a method for decoding video data, the method comprising:
performing a first pass of scanning a transform coefficient of a sub-block of a video frame, wherein the first pass of scanning comprises:
bypass decoding a parity level flag for the transform coefficient, the parity level flag indicating a parity of an absolute value of a level of the transform coefficient.

68. A non-transitory computer readable medium that stores a set of instructions that is executable by one or more processors of an apparatus to cause the apparatus to initiate a method for encoding video data, the method comprising:
performing a first pass of scanning transform coefficients of a sub-block of a video frame, wherein:

the performing of the first pass of scanning is stopped when a number of context coded bins reaches a maximum limit, a first set of transform coefficients of the sub-block are scanned in the first pass, and the first pass of scanning comprises coding, for each of the first set of transform coefficients, a significance flag indicating whether a level of the transform coefficient is zero; and performing a second pass of scanning the transform coefficients of the sub-block, wherein the second pass of scanning comprises:

binarizing an absolute value of a level for each of a second set of transform coefficients, wherein the second set of transform coefficients are not scanned in the first pass.

69. A non-transitory computer readable medium that stores a set of instructions that is executable by one or more processors of an apparatus to cause the apparatus to initiate a method for decoding video data, the method comprising:

performing a first pass of scanning transform coefficients of a sub-block of a video frame, wherein:

the performing of the first pass of scanning is stopped when a number of context coded bins reaches a maximum limit, a first set of transform coefficients of the sub-block are scanned in the first pass, and the first pass of scanning comprises decoding, for each of the first set of transform coefficients, a significance flag indicating whether a level of the transform coefficient is zero; and performing a second pass of scanning the transform coefficients of the sub-block, wherein the second pass of scanning comprises:

decoding a binarized absolute value of a level for each of a second set of transform coefficients, wherein the second set of transform coefficients are not scanned in the first pass.

70. A non-transitory computer readable medium that stores a set of instructions that is executable by one or more processors of an apparatus to cause the apparatus to initiate a method for encoding video data, the method comprising:

generating a first set of context variables for luma components of a video frame;

generating a second set of context variables for chroma components of the video frame;

generating a sub-block of the video frame; and coding a first set of transform coefficients of the sub-block according to the first set of context variables and the second set of context variables.

71. A non-transitory computer readable medium that stores a set of instructions that is executable by one or more processors of an apparatus to cause the apparatus to initiate a method for decoding video data, the method comprising:

receiving a video frame;

splitting the video frame into a plurality of sub-blocks;

generating a first set of context variables for luma components of the video frame;

generating a second set of context variables for chroma components of the video frame; and decoding a first set of transform coefficients of the sub-block according to the first set of context variables and the second set of context variables.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A coding method implemented by an encoder of video data, the method comprising:

performing a first pass of scanning a plurality of transform coefficients of a sub-block of a video frame, wherein coding of the sub-block is executed by multiple passes of scanning of the sub-block including the first pass of scanning and a second pass of scanning, the first pass of scanning comprising:

determining whether a remaining number of context coded bins (MaxCcbs) being greater than or equal to 4; and in response to the remaining number of context coded bins being greater than or equal to 4, performing:

coding a sig_coeff_flag for a current transform coefficient, the sig_coeff_flag indicating whether a level of the current transform coefficient is zero; and in response to the level of the current transform coefficient being not zero, coding a coeff_sign_flag and an abs_level_gtx_flag[0] for the current transform coefficient, the coeff_sign_flag representing the sign of the level of the current transform coefficient and the abs_level_gtx_flag[0] representing the absolute value of the level of the current transform coefficient is greater than 1; and performing the second pass of scanning the plurality of transform coefficients of the sub-block of the video frame, the second pass of scanning comprising:

in response to the abs_level_gtx_flag[0] for the current transform coefficient being equal to 1, coding an abs_level_gtx_flag[1] for the current transform coefficient, the abs_level_gtx_flag[1] indicating whether the absolute value of the level of the current transform coefficient is greater than 3;

in response to the abs_level_gtx_flag[1] for the current transform coefficient being equal to 1, coding an abs_level_gtx_flag[2] for the current transform coefficient, the abs_level_gtx_flag[2] indicating whether the absolute value of the level of the current transform coefficient is greater than 5;

in response to the abs_level_gtx_flag[2] for the current transform coefficient being equal to 1, coding an abs_level_gtx_flag[3] for the current transform coefficient, the abs_level_gtx_flag[3] indicating whether the absolute value of the level of the current transform coefficient is greater than 7; and in response to the abs_level_gtx_flag[3] for the current transform coefficient being equal to 1, coding an abs_level_gtx_flag[4] for the current transform coefficient, the abs_level_gtx_flag[4] indicating whether the absolute value of the level of the current transform coefficient is greater than 9.

2. The coding method of claim 1, further comprising: in response to the remaining number of context coded bins being smaller than 4, terminating the first pass of scanning.

3. The coding method of claim 1, further comprising:

receiving the video frame; and splitting the video frame into a plurality of sub-blocks including the sub-block.

4. The coding method of claim 1, further comprising:

performing a third pass of scanning the plurality of transform coefficients of the sub-block of the video frame, the third pass of scanning comprising:

in response to the abs_level_gtx_flag[4] for the current transform coefficient being equal to 1, coding an abs_remainder for the current transform coefficient, the abs_remainder indicating a remaining absolute level.

5. The coding method of claim 1, wherein the first pass scanning further comprises:
in response to the abs_level_gtx_flag[0] for the current transform coefficient being equal to 1, coding a parity level flag for the current transform coefficient, the parity level flag indicating a parity of an absolute value of the current transform coefficient.

6. A system to encode video data, the system comprising:
at least one memory for storing instructions; and
at least one processor configured to execute the instructions to cause the apparatus to perform operations comprising:
performing a first pass of scanning a plurality of transform coefficients of a sub-block of a video frame, wherein coding of the sub-block is executed by multiple passes of scanning of the sub-block including the first pass of scanning and a second pass of scanning, the first pass of scanning comprising:
determining whether a remaining number of context coded bins (MaxCcbs) being greater than or equal to 4; and
in response to the remaining number of context coded bins being greater than or equal to 4, performing:
coding a sig_coeff_flag for a current transform coefficient, the sig_coeff_flag indicating whether a level of the current transform coefficient is zero; and
in response to the level of the current transform coefficient being not zero, coding a coeff_sign_flag and an abs_level_gtx_flag[0] for the current transform coefficient, the coeff_sign_flag representing the sign of the level of the current transform coefficient and the abs_level_gtx_flag[0] representing the absolute value of the level of the current transform coefficient is greater than 1; and
performing the second pass of scanning the plurality of transform coefficients of the sub-block of the video frame, the second pass of scanning comprising:
in response to the abs_level_gtx_flag[0] for the current transform coefficient being equal to 1, coding an abs_level_gtx_flag[1] for the current transform coefficient, the abs_level_gtx_flag[1] indicating whether the absolute value of the level of the current transform coefficient is greater than 3;
in response to the abs_level_gtx_flag[1] for the current transform coefficient being equal to 1, coding an abs_level_gtx_flag[2] for the current transform coefficient, the abs_level_gtx_flag[2] indicating whether the absolute value of the level of the current transform coefficient is greater than 5;
in response to the abs_level_gtx_flag[2] for the current transform coefficient being equal to 1, coding an abs_level_gtx_flag[3] for the current transform coefficient, the abs_level_gtx_flag[3] indicating whether the absolute value of the level of the current transform coefficient is greater than 7; and
in response to the abs_level_gtx_flag[3] for the current transform coefficient being equal to 1, coding an abs_level_gtx_flag[4] for the current transform coefficient, the abs_level_gtx_flag[4] indicating whether the absolute value of the level of the current transform coefficient is greater than 9.

7. The system of claim 6, wherein the operations further comprise: in response to the remaining number of context coded bins being smaller than 4, terminating the first pass of scanning.

8. The system of claim 6, wherein the operations further comprise:
receiving the video frame; and
splitting the video frame into a plurality of sub-blocks including the sub-block.

9. The system of claim 6, wherein the operations further comprise:
performing a third pass of scanning the plurality of transform coefficients of the sub-block of the video frame, the third pass of scanning comprising:
in response to the abs_level_gtx_flag[4] for the current transform coefficient being equal to 1, coding an abs_remainder for the current transform coefficient, the abs_remainder indicating a remaining absolute level.

10. The system of claim 6, wherein the first pass scanning further comprises:
in response to the abs_level_gtx_flag[0] for the current transform coefficient being equal to 1, coding a parity level flag for the current transform coefficient, the parity level flag indicating a parity of an absolute value of the current transform coefficient.

11. A non-transitory computer readable storage medium storing a bitstream of video data for processing according to a method comprising:
performing a first pass of scanning a plurality of transform coefficients of a sub-block of a video frame, wherein decoding of the sub-block is executed by multiple passes of scanning of the sub-block including the first pass of scanning and a second pass of scanning, the first pass of scanning comprising:
determining whether a remaining number of context coded bins (MaxCcbs) being greater than or equal to 4; and
in response to the remaining number of context coded bins being greater than or equal to 4, performing:
decoding a sig_coeff_flag for a current transform coefficient, the sig_coeff_flag indicating whether a level of the current transform coefficient is zero; and
in response to the level of the current transform coefficient being not zero, decoding a coeff_sign_flag and an abs_level_gtx_flag[0] for the current transform coefficient, the coeff_sign_flag representing the sign of the level of the current transform coefficient and the abs_level_gtx_flag[0] representing the absolute value of the level of the current transform coefficient is greater than 1; and
performing the second pass of scanning the plurality of transform coefficients of the sub-block of the video frame, the second pass of scanning comprising:
in response to the abs_level_gtx_flag[0] for the current transform coefficient being equal to 1, decoding an abs_level_gtx_flag[1] for the current transform coefficient, the abs_level_gtx_flag[1] indicating whether the absolute value of the level of the current transform coefficient is greater than 3;
in response to the abs_level_gtx_flag[1] for the current transform coefficient being equal to 1, decoding an abs_level_gtx_flag[2] for the current transform coefficient, the abs_level_gtx_flag[2] indicating whether the absolute value of the level of the current transform coefficient is greater than 5;

in response to the abs_level_gtx_flag[2] for the current transform coefficient being equal to 1, decoding an abs_level_gtx_flag[3] for the current transform coefficient, the abs_level_gtx_flag[3] indicating whether the absolute value of the level of the current transform coefficient is greater than 7; and in response to the abs_level_gtx_flag[3] for the current transform coefficient being equal to 1, decoding an abs_level_gtx_flag[4] for the current transform coefficient, the abs_level_gtx_flag[4] indicating whether the absolute value of the level of the current transform coefficient is greater than 9.

12. The computer readable medium of claim 11, wherein the bitstream is for further processing according to the method comprising: in response to the remaining number of context coded bins being smaller than 4, terminating the first pass of scanning.

13. The computer readable medium of claim 11, wherein the bitstream is for further processing according to the method comprising:

performing a third pass of scanning the plurality of transform coefficients of the sub-block of the video frame.

14. The computer readable medium of claim 13, wherein the third pass of scanning comprising:

in response to the abs_level_gtx_flag[4] for the current transform coefficient being equal to 1, decoding an abs_remainder for the current transform coefficient, the abs_remainder indicating a remaining absolute level.

15. The computer readable medium of claim 11, wherein the first pass scanning further comprises:

in response to the abs_level_gtx_flag[0] for the current transform coefficient being equal to 1, decoding a parity level flag for the current transform coefficient, the parity level flag indicating a parity of an absolute value of the current transform coefficient.

16. A system to decode video data, the system comprising:
at least one memory for storing instructions; and
at least one processor configured to execute the instructions to cause the apparatus to perform operations comprising:
performing a first pass of scanning a plurality of transform coefficients of a sub-block of a video frame, wherein decoding of the sub-block is executed by multiple passes of scanning of the sub-block including the first pass of scanning and a second pass of scanning, the first pass of scanning comprising:
determining whether a remaining number of context coded bins (MaxCcbs) being greater than or equal to 4; and
in response to the remaining number of context coded bins being greater than or equal to 4, performing:
decoding a sig_coeff_flag for a current transform coefficient, the sig_coeff_flag indicating whether a level of the current transform coefficient is zero; and
in response to the level of the current transform coefficient being not zero, decoding a coeff_sign_flag and an abs_level_gtx_flag[0] for the current transform coefficient, the coeff_sign_flag representing the sign of the level of the current transform coefficient and the abs_level_gtx_flag[0] representing the absolute value of the level of the current transform coefficient is greater than 1; and performing the second pass of scanning the plurality of transform coefficients of the sub-block of the video frame, the second pass of scanning comprising:
in response to the abs_level_gtx_flag[0] for the current transform coefficient being equal to 1, decoding an abs_level_gtx_flag[1] for the current transform coefficient, the abs_level_gtx_flag[1] indicating whether the absolute value of the level of the current transform coefficient is greater than 3;

in response to the abs_level_gtx_flag[1] for the current transform coefficient being equal to 1, decoding an abs_level_gtx_flag[2] for the current transform coefficient, the abs_level_gtx_flag[2] indicating whether the absolute value of the level of the current transform coefficient is greater than 5;

in response to the abs_level_gtx_flag[2] for the current transform coefficient being equal to 1, decoding an abs_level_gtx_flag[3] for the current transform coefficient, the abs_level_gtx_flag[3] indicating whether the absolute value of the level of the current transform coefficient is greater than 7; and in response to the abs_level_gtx_flag[3] for the current transform coefficient being equal to 1, decoding an abs_level_gtx_flag[4] for the current transform coefficient, the abs_level_gtx_flag[4] indicating whether the absolute value of the level of the current transform coefficient is greater than 9.

17. The system of claim 16, wherein the operations further comprise: in response to the remaining number of context coded bins being smaller than 4, terminating the first pass of scanning.

18. The system of claim 16, wherein the operations further comprise:
receiving a video bitstream corresponding to the video frame having a plurality of sub-blocks including the sub-block.

19. The system of claim 16, wherein the operations further comprise:
performing a third pass of scanning the plurality of transform coefficients of the sub-block of the video frame, the third pass of scanning comprising:
in response to the abs_level_gtx_flag[4] for the current transform coefficient being equal to 1, decoding an abs_remainder for the current transform coefficient, the abs_remainder indicating a remaining absolute level.

20. The system of claim 16, wherein the first pass scanning further comprises:
in response to the abs_level_gtx_flag[0] for the current transform coefficient being equal to 1, decoding a parity level flag for the current transform coefficient, the parity level flag indicating a parity of an absolute value of the current transform coefficient.

* * * * *